(12) United States Patent
Ghosh et al.

(10) Patent No.: US 9,305,133 B1
(45) Date of Patent: Apr. 5, 2016

(54) SYSTEM AND METHOD FOR SELECTIVE APPLICATION AND RECONCILIATION OF HIERARCHICAL ORDERED SETS OF CIRCUIT DESIGN CONSTRAINTS WITHIN A CIRCUIT DESIGN EDITOR

(71) Applicant: CADENCE DESIGN SYSTEMS, INC., San Jose, CA (US)

(72) Inventors: Sandipan Ghosh, New Delhi (IN); Anjna Khanna, New Delhi (IN)

(73) Assignee: Cadence Design Systems, Inc., San Jose, CA (US)

( * ) Notice: Subject to any disclaimer, the term of this patent is extended or adjusted under 35 U.S.C. 154(b) by 0 days.

(21) Appl. No.: 14/476,807

(22) Filed: Sep. 4, 2014

(51) Int. Cl.
*G06F 15/04* (2006.01)
*G06F 17/50* (2006.01)

(52) U.S. Cl.
CPC ................. *G06F 17/5081* (2013.01)

(58) Field of Classification Search
USPC .......................................................... 716/139
See application file for complete search history.

(56) References Cited

U.S. PATENT DOCUMENTS 7,765,505 B2 * 7/2010 Harashima et al. ........... 716/106

* cited by examiner

*Primary Examiner* — Eric Lee
(74) *Attorney, Agent, or Firm* — Rosenberg, Klein & Lee

(57) ABSTRACT

A system and method are provided for selective application and expeditious reconciliation of constraints within a hierarchy of circuit design constraints. A semi-transparent constraint editor user interface is provided in contextual registration near detected violations during editing interactions with a circuit design. The constraint editor provides a simplified representation of a lookup order of a hierarchy of constraints applicable to an object related to the detected violation. The user is then able to easily modify constrained values within the lookup order, modify the lookup order, or modify the editing interaction to reconcile the violation expeditiously all while maintaining context within the circuit design.

20 Claims, 13 Drawing Sheets

SYSTEM AND METHOD FOR SELECTIVE APPLICATION AND RECONCILIATION OF HIERARCHICAL ORDERED SETS OF CIRCUIT DESIGN CONSTRAINTS WITHIN A CIRCUIT DESIGN EDITOR

BACKGROUND OF THE INVENTION

The present invention is generally directed to a system and method for selective application and reconciliation of hierarchical sets of circuit design constraints within a circuit design editor.

More particularly, the subject system and method relate to user-friendly and largely automated management, modification, and selective application of circuit design constraints towards a more efficient reconciliation thereof in designing and fabricating an integrated circuit (IC) product.

Presently, a circuit design may incorporate upwards of tens of billions of transistors or more and the number of transistors is expected to continue doubling every eighteen months. To conservatively estimate circuit performance and avoid emergent problems with fabricated circuit products, a number of conservative and pessimistic constraints are applied to various hierarchical regions of a circuit design. In such manner, a host of constraints may apply to a circuit design, specific layers thereof, specific types of fabrication/foundry technology, specific bounded portions, nets, specific objects, and the like. A substantial number of overly-pessimistic constraints may apply to each object in a circuit design to ensure the fabricated product functions appropriately in all operational environments. A single object may be constrained globally via the host of constraints illustrated above including: an application or foundry set of constraints, design constraints, net constraints, group constraints, bounded area constraints, constraints related to the specific circuit object, and the like.

When a circuit designer utilizes an electronic design automation (EDA) tool such as a circuit layout editor, schematic editor, or the like, each editing interaction (such as, for example, adding, modifying, moving, or removing one or more circuit objects) may result in a number of violations of the hierarchical circuit design constraints. Determining which of the plural sets of constraints which may apply to the editing interaction or the modified circuit object (or its neighbors) has heretofore been a challenge. No suitable constraint editor for expeditious constraint determination and reconciliation while maintaining context within an EDA tool has heretofore been available.

Previous products in the art have required the user to depart from the circuit editing EDA tool and manually traverse the sets of constraints applicable to the circuit design to locate the specific constraint(s), constrained value(s), and parameter(s) or object(s) modified in the editing interaction likely to violate one of the sets of constraints. Once located, the circuit designer was required to modify/reconcile the constraints/objects in an intelligent manner while effectively blind to the context of the violation within the circuit design. Such systems heretofore known deprived the circuit designer of the contextual relation between circuit objects, editing interaction, constraints, and other related objects.

Such deficiencies have heretofore hindered efforts to minimize fabricated integrated circuit product cost, time-to-market, power requirements, and substrate area, while maximizing performance.

There is therefore a need for a system and method for selective application and reconciliation of hierarchical ordered sets of circuit design constraints within a circuit design editor.

SUMMARY OF THE INVENTION

It is an object of the present invention to provide a system and method for selective application and reconciliation of hierarchical ordered sets of circuit design constraints within a circuit design editor.

These and other objects are attained in a system and method formed in accordance with certain embodiments of the present invention.

In one exemplary embodiment, a method for selective application and reconciliation of hierarchical ordered sets of circuit design constraints includes executing a computer processor to graphically render on a display device at least a portion of a circuit design within a circuit editor user-interface. The circuit design includes a plurality of interconnected circuit objects maintained in a computer memory operably coupled to the computer processor. The hierarchical ordered sets of circuit design constraints respectively relate to different hierarchical portions of the circuit design. Any violation of at least one circuit design constraint of the hierarchical sets of constraints are detected responsive to an editing interaction with a circuit object of the displayed portion of the circuit design within the circuit editor user-interface by the user. A violating object relating to a detected violation of at least one circuit design constraint is identified. A constraint interface is graphically rendered on the display device within the circuit editor user interface to be superimposed in contextual registration proximate the violating object responsive to the detected violation. The constraint interface identifies to a user: a type of the detected violation and a hierarchical source of the circuit design constraint violated. Responsive to a user input within the circuit editor user interface, the method selectively: (1) modifies the editing interaction, (2) modifies the application of at least one circuit design constraint of the hierarchical sets of constraints, or (3) modifies at least one circuit design constraint of the hierarchical sets of constraints, to reconcile the detected violation.

An exemplary system for selective application and reconciliation of hierarchical ordered sets of circuit design constraints within a circuit editor (where the sets respectively relate to different hierarchical portions of a circuit design) includes a design database stored in a memory maintaining the circuit design including a plurality of interconnected circuit objects and the hierarchical ordered sets of circuit design constraints. A circuit editor module is operably coupled to the design database. The circuit editor module retrieves at least a portion of the plurality of interconnected circuit objects and graphically renders the circuit objects of at least a corresponding portion of the circuit design within the circuit editor user interface on a display and receives user editing interactions with at least one circuit object of the circuit design. A violation detection module is operably coupled to the circuit editor module and the design database. The violation detection module executes to detect any violation of at least one circuit design constraint of the hierarchical sets of constraints, responsive to an editing interaction with a circuit object of the displayed portion of the circuit design within the circuit editor user-interface by a user. Additionally, the violation detection module executes to identify a violating circuit object relating to a detected violation of at least one circuit design constraint. A constraint module is operably coupled to the violation detection module and the design database and executes to retrieve circuit design constraints and circuit object data relating to the violating circuit object from the design database. The constraint module executes to graphically render on the display, within the circuit editor user-interface, a constraint interface super-imposed in contextual registration proximate the violating object responsive to the detected violation. The constraint interface identifies to a user a type of the detected violation and a hierarchical source of the circuit design constraint violated. Additionally, the constraint module executes responsive to a user input within the circuit editor user-interface to selectively modify: (1) the editing interaction, (2) the application of at least one circuit design constraint of the hierarchical sets of constraints, or (3) at least one circuit design constraint, to thereby reconcile the detected violation.

Another exemplary system for selective application and reconciliation of hierarchical ordered sets of circuit design constraints within the circuit editor includes a computer processor operably coupled to a computer memory, a user interface device, and a display device. The hierarchical ordered sets of circuit design constraints respectively relate to different hierarchical portions of the circuit design. A design database is stored in the computer memory which maintains a data representation of the circuit design including a plurality of interconnected circuit objects and the hierarchical ordered sets of circuit design constraints relating to the plurality of interconnected circuit objects. A circuit editor executes in the computer processor to retrieve at least a portion of the plurality of interconnected circuit objects from the design database in the computer memory, graphically render the corresponding circuit objects of at least a portion of the circuit design within a circuit editor user-interface on the display device, and receive user editing interactions with the portion of the circuit design from the user interface device. A violation detector executes in the computer processor to detect any violation of at least one circuit design constraint of the hierarchical sets of constraints responsive to a user editing interaction with a circuit object of the displayed portion of the circuit design within the circuit editor user-interface by a user manipulating the user interface device. The violation detector further executes to identify a violating circuit object relating to a detected violation. A constraint editor executes in the computer processor to graphically render on the display device, within the circuit editor user interface, a constraint interface superimposed in contextual registration proximate the violating object responsive to the detected violation. The constraint interface identifies to a user: a type of the detected violation and an hierarchical source of the circuit design constraint violated. Responsive to a user input within the circuit editor user-interface, the constraint editor selectively modifies: (1) the violating object in the design database, (2) the application of at least one circuit design constraint of the hierarchical set of constraints, or (3) at least one circuit design constraint of the hierarchical set of constraints to reconcile the detected violation.

Additional aspects and details will be set forth in the description which follows, and, in part, will be apparent from the description and Figures.

DETAILED DESCRIPTION OF THE PREFERRED EMBODIMENTS

Figure 1:
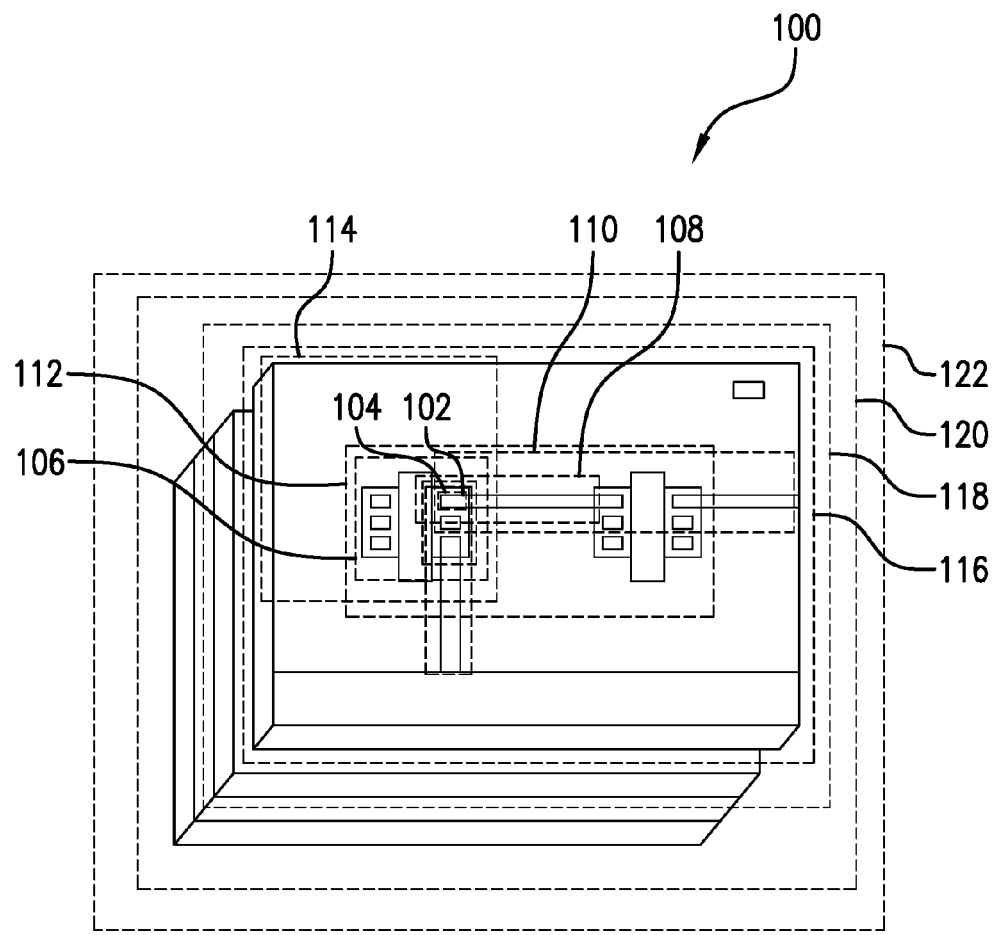
FIG. 1 is a perspective block diagram illustrating an exemplary application of a plurality of constraints within an hierarchical ordered set of constraints to a particular hierarchical portion of the circuit design.

The subject system and method are generally directed to selective application and reconciliation of hierarchical ordered sets of circuit design constraints within a circuit design editor such as a layout editor or the like.

In a typical application, a user actuates a circuit design user interface, (one such exemplary circuit editor user interface may be seen in FIGS. 5-9) to perform an editing interaction, such as to draw a polygon to create a new interconnected circuit object within the circuit design. The system and method then automatically actuate the intervening processes necessary to determine if the object edited violates any of an hierarchical set of circuit design constraints that apply to the circuit object edited. A circuit object may include any object within a circuit design such as, for example, devices, elements, routing, vias, cells, nets, and the like. In an exemplary system and method, the circuit objects are maintained as data objects within a design database (any suitable data formats, containers, and databases may be employed).

In some configurations, the system and method automatically determine a related object to the editing interaction and graphically render a constraint editor pop-up window, widget, or the like within the circuit editor user interface. The constraint editor may take the form of a semi-transparent or partially opaque (used interchangeably herein) overlaying pop-up window, widget, or the like. The constraint editor is preferably contextually registered with the circuit design proximate the violating related object so that a user is able to maintain context in the circuit design while reviewing information about the hierarchical sets of circuit design constraints. The user may maintain awareness of where the violation lies in the circuit design while concurrently reviewing the ordered hierarchical set of constraints applicable thereto.

The user is able, in such manner, to readily determine a source of the violation amongst the hierarchy of constraints applicable to the violating object.

The hierarchy of circuit design constraints may illustratively include constraints for the particular object created, constraints for a route to which the object belongs, a net thereof, a global constraint for the design, the application constraint group, a particular technology at the foundry, or the like. Each level of the hierarchy of circuit design constraints may be selectively applied with Boolean logic such as AND, OR, NOR, or the like to specific circuit objects, as well.

A violated circuit design constraint has a specified constrained value which is violated (exceeded or not met) by the editing interaction or the resultant related edited circuit object. The constraint editor user interface indicates to the user which constraint is violated and provides information on the type of constraint such as, for example: a minimum/maximum width, area, spacing, or the like. Additionally, the constraint editor user interface allows the user to quickly set or modify: (1) a constrained value of a constraint, (2) a changed application of a constraint, or (3) the user may change the editing interaction such that the object edited no longer violates a constraint.

To change a constrained value of a constraint, the constraint data object may be retrieved from the design database maintaining the circuit design, modified, and resaved, or a reference or pointer to a memory space may be followed to directly change a constrained value stored therein. To change application of a constraint, the constrained value may be set to NULL, 0, or some other value signaling its non-use. Alternatively, the Boolean logic for selective application may be modified to a NOR, INVERSE, or other such value. The editing interaction may also be modified to avoid violating a constraint.

FIG. 1 illustrates an example of a hierarchical ordered set of circuit design constraints applicable to respective hierarchical portions of the circuit design. In this example, a lookup order of hierarchical circuit design constraints applicable to object 102 is shown. The constraints include numerous different constrained values for parameters of the circuit object 102. In this exemplary instance, the constraints may apply to the minimum width of the object 102 in units of measurement such as microns, millimeters, nanometers, or other units.

Firstly, an object constraint 102 may apply, an element constraint 104 such as for contacts or the like, object constraint 106 for the device to which the object belongs such as a transistor or the like, may apply. Portions of a path segment 108 in a bounded distance along an interconnected net section 110 may have its own set of constraints such as a minimum width for objects or items within that net, such as object 102. A group of nets 112 may have further specification of circuit design constraints establishing a minimum width or other such parameters for objects within that group. In this instance, group 112 includes two transistor devices, but any number of devices or objects may be included in such a group 112. A block or bounded area 114 may be established such that any number of objects or devices within the boundary may be considered as constrained by the constraint applying to that bounded area 114.

A layer constraint 116 may be established to apply to all objects within a specified layer. Additionally, a layer group 118 may have a certain set of constraints applied to it and all objects therewithin that group of layers. The entirety of a circuit design 120 may have constraints applied to any circuit objects within that design. This may also be referred to as global or universal constraints. When the design is fabricated with a certain foundry or technology, certain sets of constraints may be applicable thereto and this is seen as a foundry or technology constraint 122 which again applies to the entirety of the circuit design acting in a global or universal manner.

When a user edits an object in a circuit design user interface, each of the hierarchical sets of constraints must be evaluated to determine if any of the constraints are established and if they are violated by the editing interaction or any of the parameters/characteristics of the edited circuit object. Still further, other circuit objects may be related to the editing interaction and may be seen to violate, such as by failing to maintain a certain spacing or other such constraint. The above example serves to illustrate the complexity and exponential nature of constraint application and relation to a single editing interaction.

Figure 2:
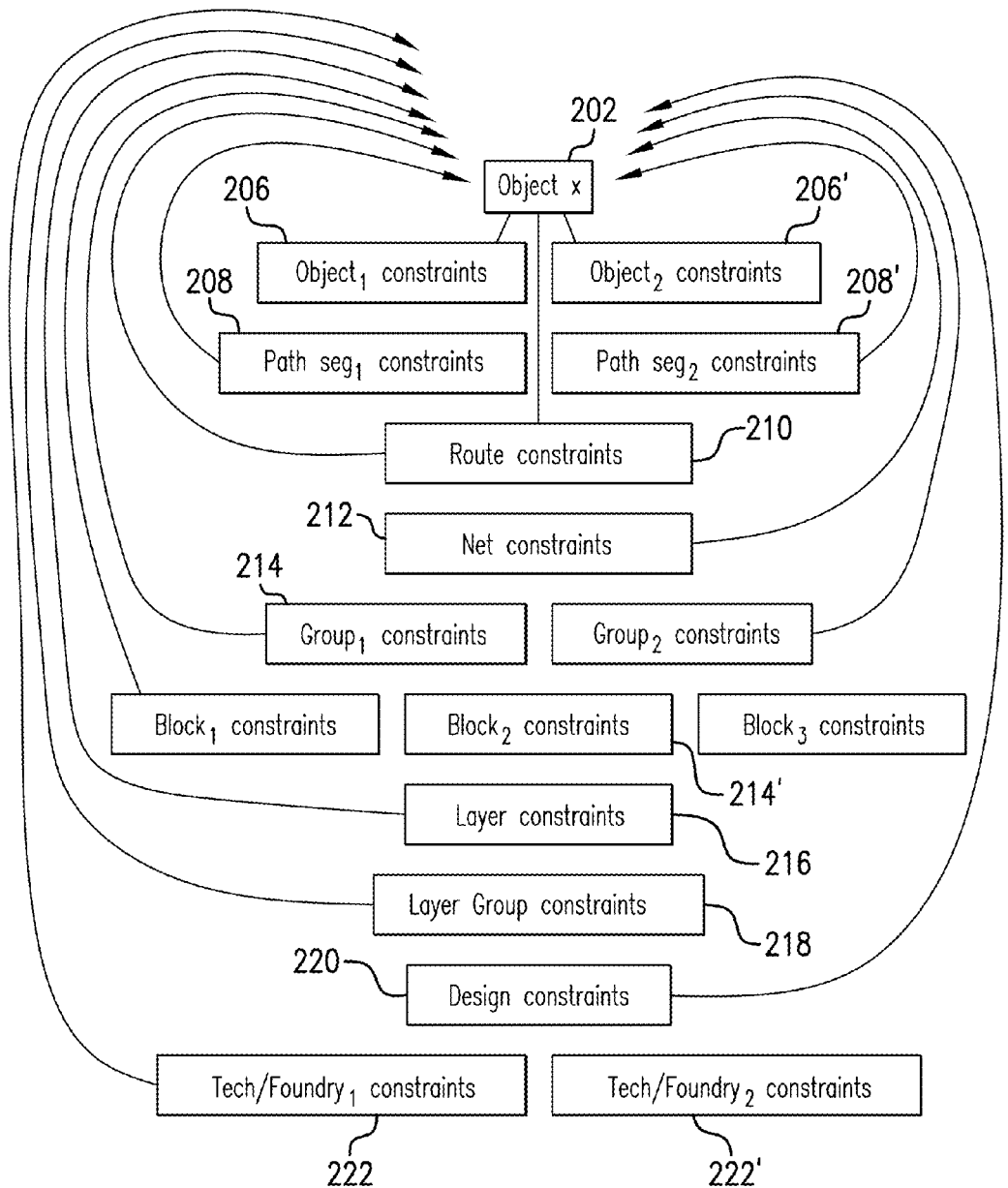
FIG. 2 is a block diagram illustrating an exemplary hierarchical set of circuit design restraints forming a lookup order applicable to an object of the circuit design.

FIG. 2 illustrates a different representation of a plurality of constraints within a hierarchy of circuit design constraints defining a lookup order applicable to a certain exemplary object 202. Object 202 is seen to be constrained by numerous circuit design constraints including object constraints 206 and 206'. Path segment constraints 208 and 208' may also be applicable to object 202. A net constraint 212 may also be applicable to object 202. The object 202 may belong to container groups, such as bounded area groups and for each grouping in which it is a member, a certain set of constraints may also be applicable to the object 202. In this instance, group 214 constraints are applicable to object 202.

If the object is a member of plural container groups of the circuit design, a respective plurality of constraints for each parameter in each group may be applicable as well, and thus, group 1, 2, and 3 constraints 214', for example, may be applicable to object 202. The object 202 may be found to be disposed within a certain layer of the circuit design and the layer constraints 216 corresponding to the layer where the object 202 lies are also applicable to that object. Additionally, layer group constraints 218, design constraints 220, tech/foundry constraints 222 and 222' may all apply to the object 202. Thus, when an editing interaction with a circuit design user interface is effected, a seemingly minor or trivial change to an object may spur a substantial number of violations of constraints requiring reconciliation—some even at the same hierarchical layer.

Determining which constraints apply to an object preferably follows a flow similar to the following:

Identify the constraint groups that apply to the object in order based on scoping. Identify the constraints within a constraint group in order, based on precedence by firstly looking at the object to determine if it has any constraints. If the object's constraint group has constraints, search the constraint group for the particular constraint. If the constraint is not found, increase scope. Continue looking at each constraint group to determine if it has constraints, and if it does, whether or not it has the constraint searched for. For example, the following illustrative logic may be employed to locate a minimum width constraint for a particular layer on a particular path segment:

Examine the object constraint group for the path segment;

Examine the default constraint group for the group containing the path segment;

Examine the default object constraint group for the route containing the path segment;

Examine the default object constraint group for the net containing the route;

Examine the default object constraint group for the bounded area;

Examine the default constraint groups for the block, design, and technology; and, Examine the foundry constraint group for the technology.

When the constraint groups applicable to a particular object are being determined, each constraint group is searched for the specific constraint. The order of members in a constraint group represents precedence and determines the order in which constraints are evaluated. For example, given a constraint group, there might be two minimum width constraints for a layer metal 1. Because the groups' members are ordered, the design rule checker first attempts to meet the first minimum width constraint. If that constraint cannot be met, it should continue to the second minimum width constraint, and so on until either the constraint is met, all of the constraints in the group are evaluated, or a hard constraint that cannot be met is encountered. If a hard constraint cannot be met, it will result in an error, and either the design or the constraints must be suitably modified.

Constraint groups can contain other constraint groups as members. When searching a constraint group for a particular constraint type, the members should be evaluated in order, in a depth-first manner. This means that if a constraint group is encountered, all of its contents are evaluated before continuing to the next member.

Figure 3:
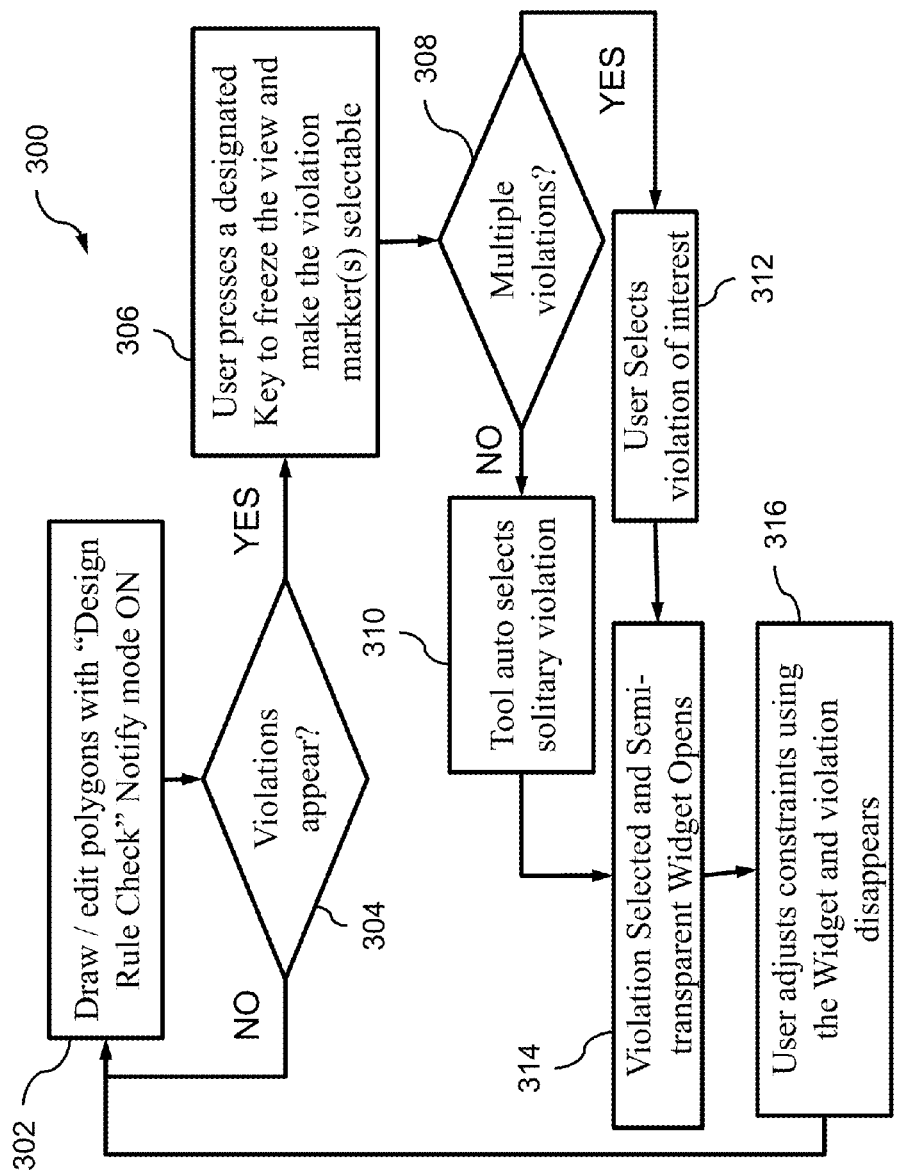
FIG. 3 is a flow diagram illustrating an exemplary flow of processes.

FIG. 3 illustrates a simplified flow diagram with exemplary processes for detecting violations and responsively rendering the constraint editor user interface. At block 302, a user interacts with a circuit design user interface graphically rendered on a display device such as a monitor. The user employs, for example, a mouse, tablet, stylus, or other user interface device to draw or edit polygons to form circuit objects within the circuit design. The circuit editor is engaged with a design rule check/violation detector to run in the background with a notify mode on. The design rule check periodically and responsive to user edits, evaluates editing interactions with the circuit design to ensure compliance with the hierarchical ordered sets of circuit design constraints. If an editing interaction results in a polygon or circuit object which has at least one parameter which does not conform to a pre-established circuit design constraint applicable thereto, then a violation is detected. If a violation of one of the constraints is detected at block 304, then flow proceeds to block 306. If no violations appear, then a loop is established to block 302 for further drawing or editing interactions (used interchangeably herein).

When violations are detected at block 304, flow proceeds to block 306 where a user may freeze execution of the circuit design user interface to enter a debugging mode. The debugging mode graphically renders visual indicia on the display device such as violation markers or annotations of the detected violations visible on the screen. The visual indicia may be actuated by a user (such as by employing a user interface device to click on the visual indicia on the screen within the circuit design editor) to learn more information about a particular violation and to reconcile that violation. To effect the freezing, a user may press a designated key on the keyboard or other such interaction with the circuit design user interface to pause execution of the editing interaction. When the circuit design user interface's execution is arrested in such manner, any violations presently detected will remain for visual indication and actuation.

Flow then proceeds to block 308 where it is determined whether there are multiple violations or merely a single violation of interest related to the editing interaction. If there is only one violation, then flow proceeds to block 310 where the violation is automatically selected, and flow proceeds to block 314 where the selected violation is displayed in a semi-transparent or partially opaque widget on the screen, such as, for example, seen in FIGS. 5-9. If, on the other hand, at block 308, multiple violations are detected, then flow proceeds to block 312 where a user selects a violation of interest, for example, by actuating a visual indicia proximate a detected violation for subsequent graphical rendering of the constraint editor in a transparent widget at block 314. The user selection of the violation of interest at block 312 may be illustratively seen in FIG. 9 where a plurality 919 and 920 of annotations, mark-ups or other visual indicia indicating a violation are seen on the display. The visual indicia preferably provide features such as: defining an array of points in the circuit editor user interface to indicate the area of the detected violation; a message string to describe the violation; a second string to be used as a tag for the violation; a measure to indicate the tool reporting the violation; a measure to indicate the severity of the violation (for example, green may signify a minor violation—whereas red may indicate a severe violation with intermediate gradations specifying increasing levels of severity); a measure to hide the visual indicia from graphical rendering while maintaining the indicia in the design database; a measure for associating the visual indicia with the circuit objects that caused the violation; and measures or conditions which, when satisfied, result in automatic removal of the visual indicia. Preferably, the visual indicia will be automatically removed when any of its associated or related circuit objects are modified, the constraints are modified, or the application of the constraints is modified. Such visual indicia are retrievable from the design database with suitable query commands.

Subsequent to the displaying of the plurality of violations and the user selection of one thereof, the semi-transparent or partially opaque widget 900 or constraint editor user interface is graphically rendered within the circuit design user interface. Flow then proceeds to block 316 where a user is presented with a lookup order of the hierarchy of circuit design constraints applicable to the selected edit interaction or circuit object, an indication of their respective constrained values, and an indication of which are violated. The user may then selectively adjust the constraints within the constraint editor user interface such as by establishing a new value or modifying the application of the constraints to the specific circuit object. Alternatively, the user may modify their editing interaction such as by continuing to expand the polygon representing an object, changing parameters thereof, or the like. Once the violation has been reconciled, the semi-transparent or partially opaque constraint editor user interface is then de-rendered or executed to remove the constraint editor user interface from the display so the user may continue further editing interactions with the circuit editor user interface.

Figure 4:
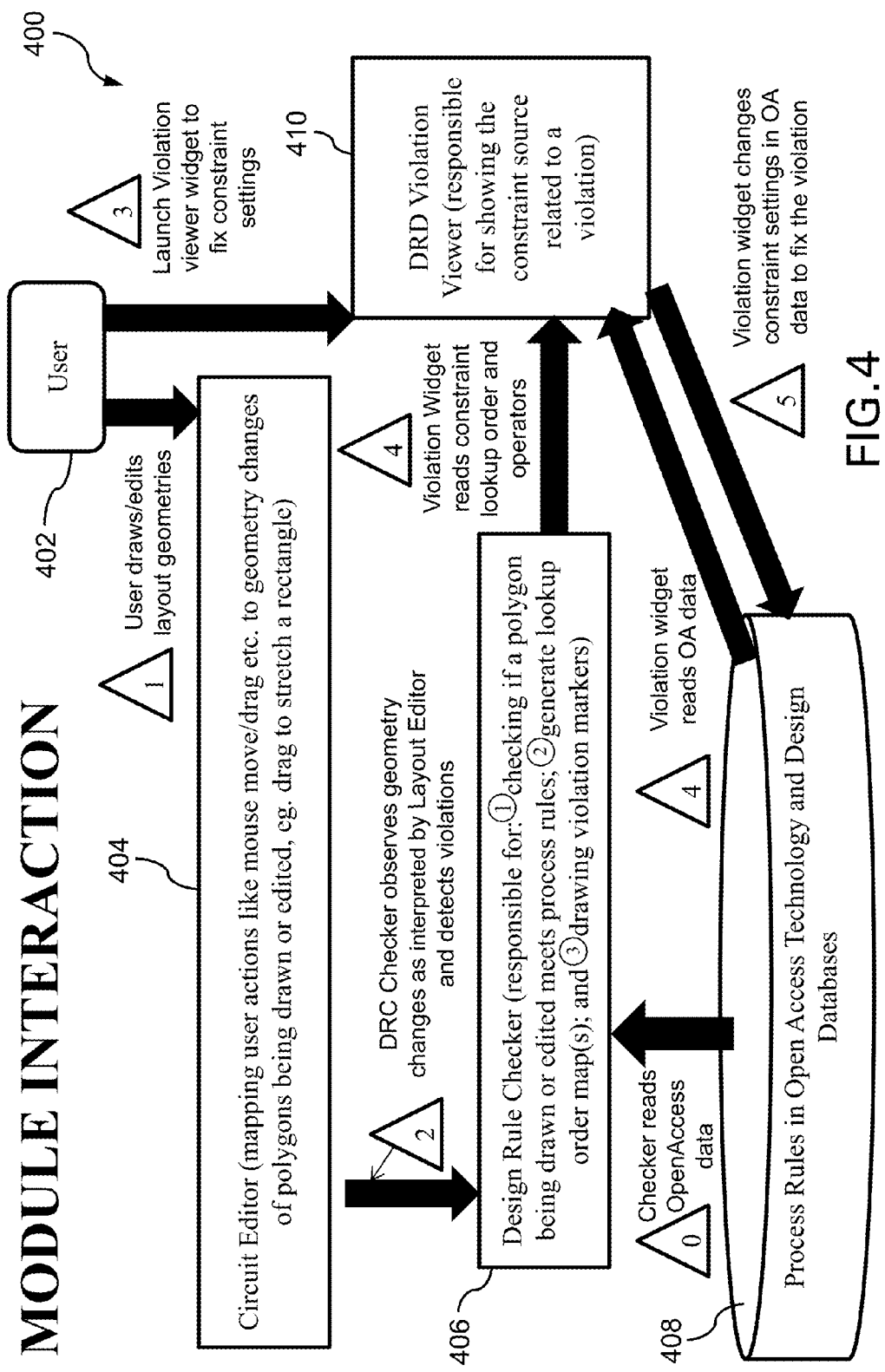
FIG. 4 is a schematic block diagram illustrating a flow of processes amongst exemplary system modules.

FIG. 4 illustrates an intercoupling of functional modules within a system for circuit design and constraint editing. A user 402 interacts with a circuit editor module 404 which may be implemented in software modules, portions of a system on-chip, a field programmable gate array (FPGA), an application specific integrated circuit (ASIC), or other suitable implementations. The circuit editor module 404 maps user interactions such as received from a user interface device operably coupled with the functional modules. The user interface device may be a mouse, stylus, or the like, to edit polygons or circuit objects within the circuit design. For example, a user may click at an X, Y coordinate position within a work space of the circuit editor user interface, drag to define an area parameter and width parameters of the polygon or object being created. When a user releases the user interface device, the circuit editor module 404 instantiates a circuit object with a polygonal shape as defined by the user's editing interaction. The circuit object is preferably stored in a design database 408.

A design rule checker/violation detector (used interchangeably herein) at block 406 observes geometry changes to the circuit design and editing interactions in the circuit editor to detect violations in one or more of the hierarchy of circuit design constraints for the circuit design. The hierarchy of circuit design constraints are also preferably retrievably maintained in the design database 408. The design rule checker at block 406 determines if a polygon being drawn or edited meets process rules or designs constraints and responsively draws a visual indicia such as a violation marker proximate the detected violation within the circuit editor for the user to determine or identify that there is indeed a violation.

As the design rule checker 406 continuously evaluates editing interactions with the circuit design, each of the constraints applicable to the parameter of interest of an object related to the editing interaction are preferably recorded in a map data object, database, or the like. The map data object is preferably maintained within short term memory or the design database 408 to serve as historical constraint path traversal markers to later reconstruct, in efficient manner, the constraint hierarchy lookup order for a particular object. In a preferred configuration, the lookup path (e.g. obj-> . . . net-> . . . design-> . . . tech) through the hierarchy of sets of circuit design constraints, Boolean and precedence operators is saved in a lookup map. Where violations are detected by the violation detector, violation pointers to each violation are established. A violation information map is generated to associate each violation with a violation query data object. When the user arrests execution of the circuit design editor, to freeze the violations in the circuit design editor and establish a debugging mode, visual indicia (preferably markers) are created and graphically rendered for each of the violations, e.g. vio1, vio2, vio3. A second map is generated to associate each visual indicia with its respective violation. When a user selects any of the visual indicia, the selection is traced back to its violation pointer/ID and further to the violation query data to graphically render the constraint lookup order along with details about the violation in the constraint editor user interface.

The design rule checker 406 interacts with design database 408 (any suitable data store for maintaining the circuit design may be employed). The design database 408 stores the circuit design including the interconnected plurality of circuit objects and the hierarchy of circuit design constraints, amongst other circuit data. The design rule checker 406 retrieves the plurality of circuit objects and the circuit design constraints applying to the circuit objects. Where a violation has been detected, the violation viewer or constraint editor module 410 (used interchangeably herein) interacts with the design rule checker module 406 and the design database module 408 to retrieve the circuit object related to the detected violation and the lookup order (preferably established in the map data object with data pointers to each of the applicable constraints serving to constrain the related object). A graphical rendering of the violation viewer or constraint editor module 410 may be seen in an exemplary system in FIG. 5 at block 508 within a graphical rendering of the circuit editor user interface 500. The user may then reconcile the constraint violation(s) within the constraint editor user interface module 410 by modifying the constraints, their application, or the editing interaction. Such modifications are then preferably stored to the design database module 408 to reconcile the violation(s).

Figure 5:
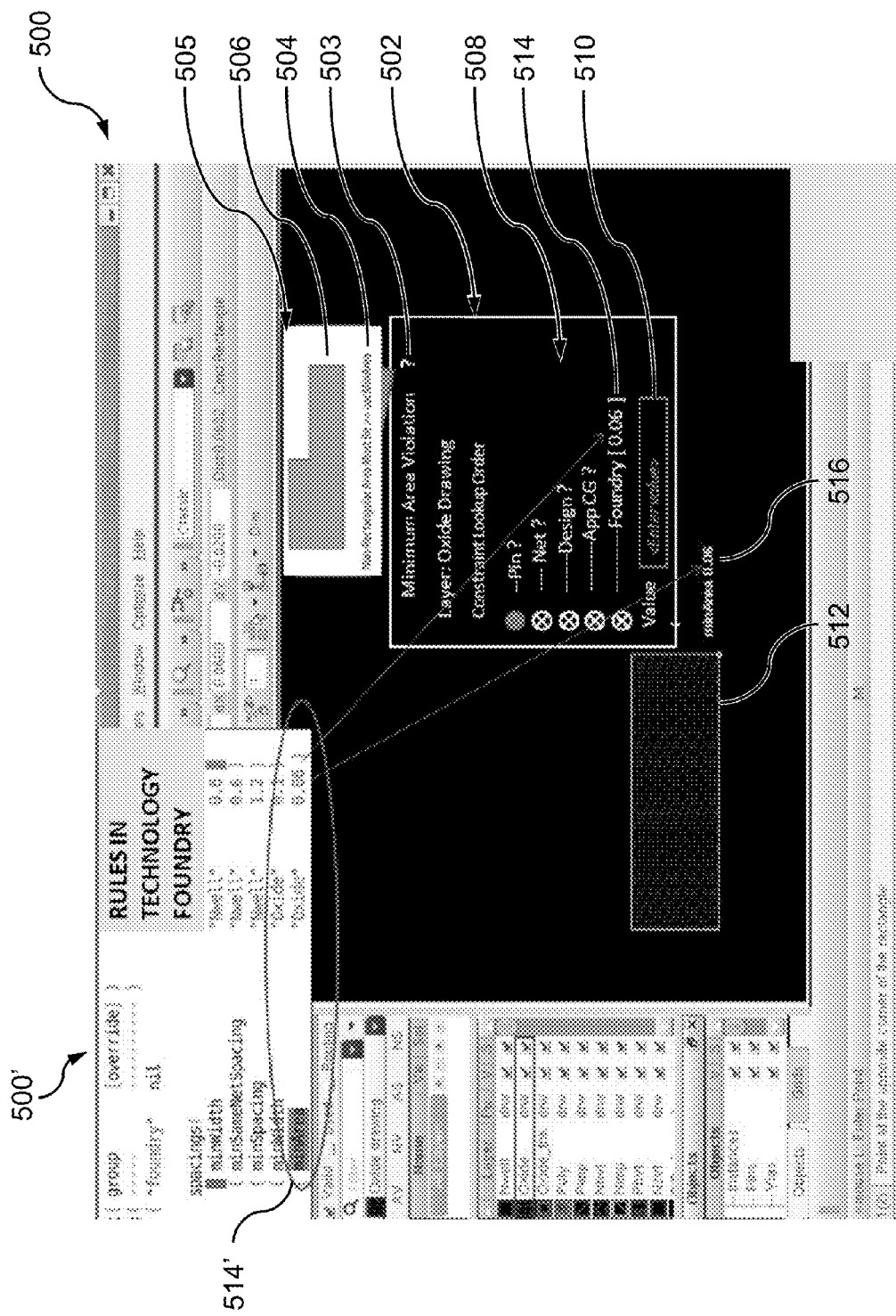
FIG. 5 shows an exemplary user interface including a graphical rendering of a portion of a circuit design along with a constraint editor user interface and a circuit editor user interface for illustrating an aspect of the disclosed system.

Turning to FIG. 5, an exemplary circuit editor user interface 500 is seen to include a constraint editor user interface 502 which are both operably coupled to the violation detector module and the design database maintaining both the circuit objects and the constraints thereof. Both the circuit editor interface 502 and constraint editor interface 508 are preferably executed on a processor, though they may be implemented with other suitable devices. An exemplary portion of a constraint data object maintained in the design database is seen in window 500' where a plurality of constraints are maintained for the circuit objects of the circuit design.

An exemplary minimum area constraint 514' "minArea" is established at the foundry/technology hierarchical layer to have a constrained value of "0.06". This may be due to limitations in the foundry itself which may not be able to fabricate polygons of the circuit object with less area than the "0.06" constrained value. Thus, the minimum area for all objects fabricated through the particular foundry is established to be at "0.06" units. Additionally, another plurality of other constraints are established with constrained values targeting a plurality of other parameters of circuit objects in the circuit design. For example, a minimum width is specified for an "nwell" type technology to be "0.6", a "minSameNetSpacing" constraint for "nwell" is established have a constrained value of "0.06", a "minSpacing" for "nwell" is established to be "1.2", and a "minWidth" constraint for "oxide" technology is established to be "0.1". Any number of constraints targeting any number of objects or parameters thereof may be established in the design database or stored externally therefrom to reference the circuit objects.

As a user establishes a polygon 512 within the circuit editor user interface, the editing interaction and the circuit object being interacted with are evaluated by the always-on design rule checker or violation module to determine violation of any of the circuit design constraints applicable thereto. Each circuit object or group thereof may have a hierarchy or plurality of circuit design constraints applicable thereto. The applicable circuit design constraints establish a lookup order that may use Boolean logic to combine certain constraints, such as by logical uses such as AND, OR, NOR, and the like, to combine plural constraints to form a lookup order amongst the hierarchy of circuit design constraints. As the always on design rule checker or violation detector evaluates the lookup order of circuit design constraints, a number of metaphorical bread crumbs are created (preferably in a map type data object) storing data pointers to the data objects representing each circuit design constraint applicable to the edited circuit object in the design database.

Upon completion of an iteration of evaluation of all of the applicable circuit design constraints to a parameter of a particular object relating to the editing interaction, a map is established representing the lookup order. Such map may be seen to be representative of a lookup order 508 referencing an order of applicable constraints of the hierarchical set of system constraints such as illustrated in the constraint editor 502 (this will be discussed further in relation to the constraint editor 502 below). As a user completes the editing interaction and the violation detector completes evaluation of the circuit design constraints, if at least one violation of at least one constraint has been detected, then a visual indicia 516 is drawn proximate the detected violation 512 within the circuit editor user interface 500. Such visual indicia 516 may be implemented in an annotation, marker, or the like which serves to graphically distinguish a violating object or violating interaction in the circuit design. If there is only one such violation, then the constraint editor user interface 502 is executed to be graphically rendered in contextual registration proximate the visual indicia 516 of the violating circuit object 512. In such manner, the user may maintain a contextual awareness of the local portion of the circuit design being edited or manipulated and also see the violation and which constraint is being violated within the applicable lookup order 508 of the circuit design constraints.

The constraint editor 502 is graphically rendered to include information helpful to the circuit designer in one convenient and readily accessible user interface. The constraint editor is preferably rendered in semi-transparent manner so that circuit objects are visible through the constraint editor 502 to maintain a more contextually-aware experience for the user. Firstly, the type of circuit design constraint violated is displayed at 503. A certain visual indicia, for example a question mark, is actuated to trigger the opening of a new sub-window 505, itself including both a graphical explanation 506 and a textual explanation 504 of the type of violation and the types of parameters of circuit objects which may lead to a violating object.

Additionally, the constraint editor displays circuit design layer information and lookup order 508 including the hierarchy of circuit design constraints applicable to the edited circuit object. A user selectable control for modifying a particular constraint within the lookup order or hierarchical set of constraints is preferably provided. Such selectable user control may illustratively be implemented in a radio selection box, though other suitable measures may likewise be employed. The user is able to selectively choose one or plural circuit design constraints within the lookup order thereof for modification. In this illustrative Figure, the user has selected the "pin" layer of the hierarchical lookup order of circuit design constraints. The question mark to the right of the pin layer is employed to indicate that the pin constraint has yet to be set. Likewise, the net, design, and application constraint group (CG) layers are also unset and remain at their default, null, or unset values. In contradistinction, the foundry constraint at block 514 has been pre-established to have a constrained value of "0.06". Thus, if the circuit object being instantiated or created by the user editing interaction with the circuit editing user interface is evaluated to have a minimum area of less than the constrained value of "0.06", then the circuit object and the editing interaction will be seen to violate the foundry constraint 514. If a user wishes to modify a constrained value, the user may selectively choose one constraint, such as the pin constraint and enter a modified constrained value in the value entry box 510. In alternative configurations, the user operable controls 508 may allow a user to automatically restore a particular constraint to a default or NULL value.

Figure 6:
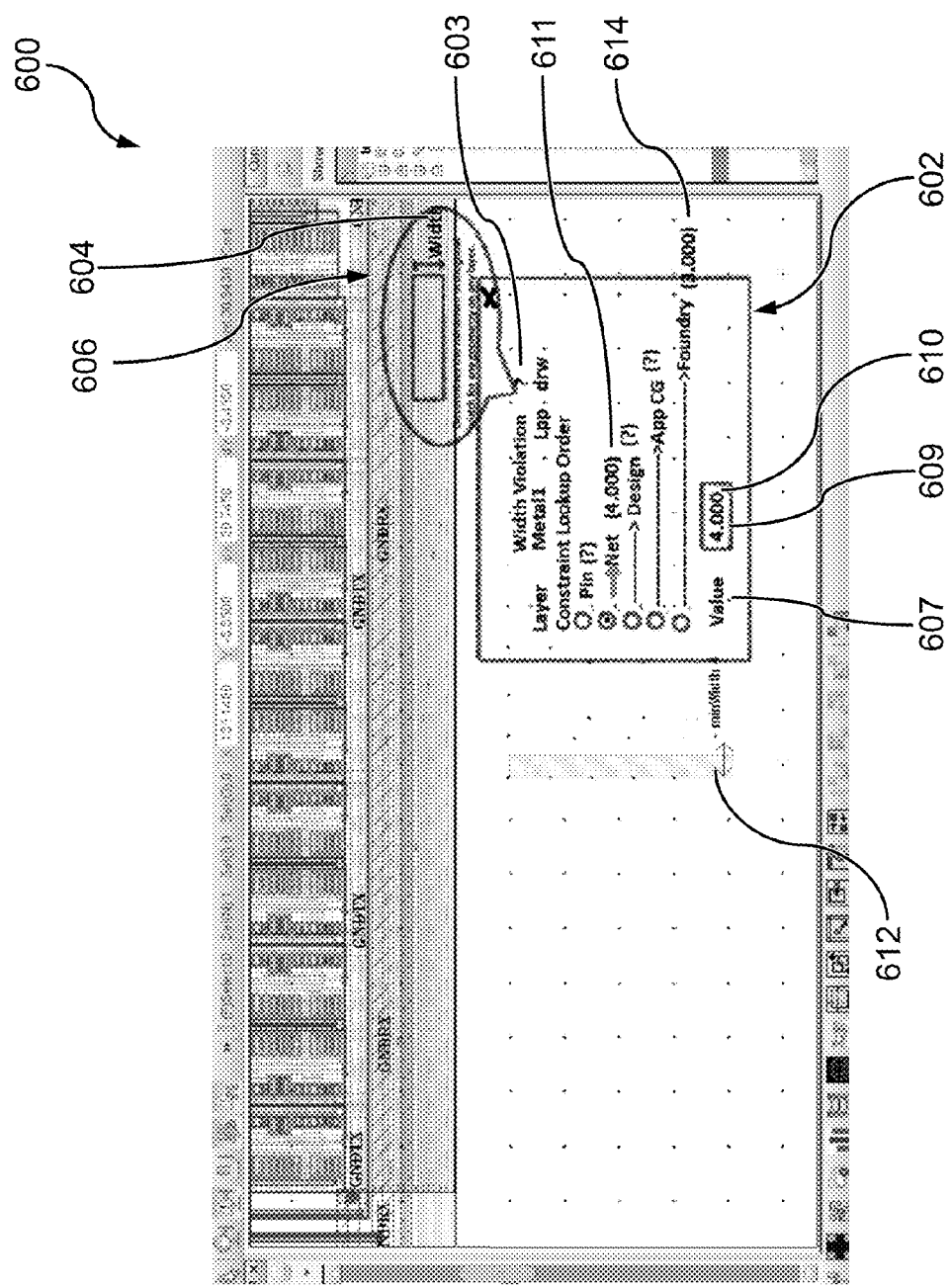
FIG. 6 shows an exemplary user interface including a graphical representation of a circuit design, a circuit editor and a constraint editor user interface for illustrating another aspect of the disclosed system.

As seen in FIG. 6, another exemplary graphical circuit design user interface 600 and constraint editor user interface 602 are illustrated. When a user performs an editing interaction 612 with the circuit editor user interface (which may be part of a layout editor tool suite, a schematic editor tool suite, a mask editor tool suite, or the like), a user generally modifies, creates, or deletes a polygon to form a circuit object as seen at block 612. A violation detector or design rule detector with always on notification monitors the editing interaction and the modified circuit object for violation of any of the hierarchical set of circuit design constraints applicable thereto. As the user is editing, a visual graphical indicia such as seen at 612 including an indication of the type of constraint and another indicia for showing how to remedy it by editing are rendered. When a user either completes the editing interaction or initiates a debugging interface, the execution of the circuit design editor user interface is preferably frozen. A visual indicia 612 such as an annotation, marker, or other such suitable visual indicia will be graphically rendered proximate the instant editing interaction. In the event that there is only one violation triggered by the editing interaction, the graphical indicia of the annotation or marker may be omitted and the constraint editor user interface 602 may be automatically launched responsive to the detection of the violation. The constraint editor user interface 602 is preferably graphically rendered in contextual registration in close proximity to the editing interaction which triggered the violation. The constraint editor user interface 602 is preferably graphically rendered to have a semi-transparent or partially-opaque property such that a portion of the underlying circuit design and the circuit design user interface 600 are visible through the constraint editor user interface 602. This may be implemented in a number of ways, such as by generating a composite image for the constraint editor user interface window, by generating a background thereof with alpha blending, or by a derivative screen capture of the background image of the circuit design mixed with an alpha blending stage, or the like, to generate a composite image to serve as the background of the constraint editor user interface window 602 which may include at least a portion of the circuit design and a number of user operable controls relating to the detected violation.

The constraint editor user interface window 602 preferably indicates to the user at 603 a type of violation or a type of parameter of at least one circuit object which violates a circuit design constraint within the hierarchy of constraints. Preferably, a visual indicia such as a question mark may be user operable to generate yet a further semi-transparent or partially opaque window rendered concurrently with the circuit editor user interface 602 to display both a graphical 606 and textual 604 explanation of the type of violation, the parameters of the effected circuit object, and further editing interactions which may remedy or reconcile the violation. Additionally, the constraint editor user interface window 602 indicates to a user a layer of the violation, a defined purpose of the layer (such as a trace layer, metal layer, or the like), and the like.

A lookup order 611 is displayed to the user to indicate at least a portion of the hierarchy of circuit design constraints applicable to the effected object relating to the editing interaction which triggered the violation. In this illustrative Figure, the lookup order includes a pin constraint, a net constraint, a design constraint, an application constraint group (CG), and a foundry constraint. Only the particular net and foundry constraints have been specifically set to have a particular constrained value. As indicated in the circuit editor user interface, the minimum width "4" at 612 has not been met. A circuit designer without more information is left to determine on their own by manual search and traversal of the hierarchies which circuit constraint establishes the value of "4". The circuit designer may perhaps recall that the foundry has a specified constraint minimum width of "3" which they believe they have satisfied and they are perhaps puzzled as to the application of the remainder of the constraint group. With the constraint editor user interface window 602, the constraint lookup order is graphically displayed for the user to see that while the foundry constraint 614 has been established to have a constrained value of "3", the more specific (granular or locally applicable net constraint 611—applying only to the specified net rather than the entirety of the design) net constraint 611 has been established to have a constrained value of "4.0". The constraint editor user interface generates a visual indicia 609 to conspicuously indicate which constraint value/(s) in the lookup order or hierarchy are currently violated. In this instance, the graphical indicia 609 indicates that net constraint 611 has been violated and the constrained value is also indicated as "4.0".

Responsively, a user may selectively modify the editing interaction at block 612 such as by increasing the width of the polygon to meet the minimum width of "4.0" as specified in the net constraint 611; the user may selectively modify the constrained value of "4.0" in the net constraint; or the user may modify the application of the constraints to the specific related circuit object. In the first instance where the user seeks to modify the editing interaction or the circuit object, the user may escape from the violation and continue drawing to extend the circuit object another distance unit to satisfy the minimum width of "4.0" as specified in the net constraint. In the second instance where the user wishes to change the value of the net constraint, the user may selectively indicate in the constraint editor user interface window 602 that the net constraint is to be edited. The user may effect this by choosing the radio button indicator circle on the left of a constraint e.g. net constraint 611 which populates the value field 610 with the instant constrained value of the selected constraint 611. While a radio button or option button configuration has been illustratively shown in the constraint editor user interface 602 for selecting a constraint, any number of suitable user controls may be employed, such as check boxes, or the like. The user may selectively modify the constrained value "4.0" at value field 610 by adaptively inputting a value such as "3.0" or a zero/NULL value which may indicate an unsetting of this constraint which itself may modify the application of the constraint to the circuit object. Additionally, a user may remove hierarchical layers of the constraints from application to the related circuit object such as with a user-operable graphical indicia such as an "X" or other suitable operable indicia proximate each hierarchical layer in the lookup order. For example, an "X" disposed on the left or right-hand side of the net constraint 611 may automatically remove the net constraint group from the lookup order applicable to the effected circuit object. Additionally, Boolean connectors such as AND, OR, NOR, and the like may be employed to create a complex logical application of the hierarchical lookup order of circuit design constraints.

Figure 7:
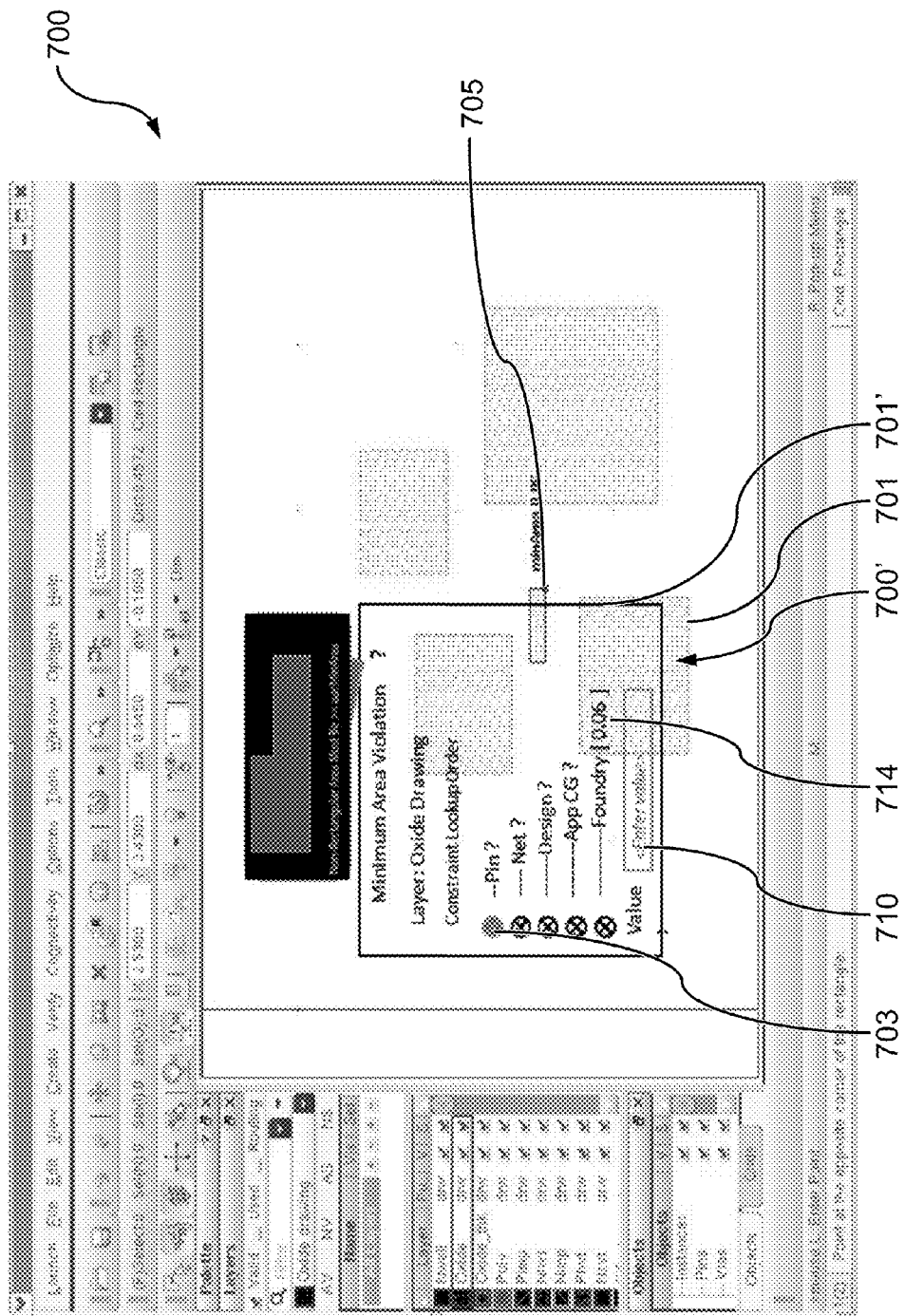
FIG. 7 shows an exemplary circuit editor user interface illustrating a further aspect of the disclosed system.

Turning to FIG. 7, another illustrative circuit editor user interface 700 is illustrated. Within the circuit editor user interface 700, a constraint editor user interface 700' is graphically rendered in contextual registration with and proximate to an affected circuit object resulting from an editing interaction within the circuit editor user interface 700. The constraint editor user interface 700' may be graphically rendered to be in contextual registration and proximate either an affected circuit object or an editing interaction. Firstly, an X and Y coordinate of an editing interaction or an affected circuit object are determined. Then, an X and Y dimensionality of a view of the circuit design is determined. Then an expected size in pixels or a common unit of distance is determined for with the constraint editor to determine an acceptable position of the display for graphically rendering the constraint editor user interface 700'.

For example, when a user interacts with the circuit editor user interface 700 to create a new circuit object 705, a first coordinate ($X_1, Y_1$) corresponds with a first upper left corner of the new polygon representing the new circuit object, and a second coordinate ($X_2, Y_2$) corresponds with an opposing corner of the circuit object to be created. If, for example, the first coordinate is (400, 300) and the second coordinate is (440, 320), then it may be determined that the circuit object has a dimensionality of 40×20 units within the circuit editor user interface 700. To register the constraint editor user interface 700' with the new circuit object 705, an edge of the graphically rendered constraint editor 700' should be graphically rendered within a suitable distance of the new circuit object 705. For example, the constraint editor user interface 700' may be graphically rendered within e.g. 20, 100, 200 graphical units, or any other suitable distance from the edited circuit object 705. The constraint editor user interface 700' may be displaced from or overlapping the object. It may be assumed that if the constraint editor user interface 700' is known to take a certain number of pixels, such as for example, e.g. 100 pixels, and the display window is known to have, for example, e.g., 800 pixels, the constraint editor user interface 700' may be graphically rendered proximate the editing interaction 705. However, ensuring that the entirety of the 100 pixels required in a first dimension of the constraint editor user interface 700' fits within the display window of 800 pixels within the circuit editor user interface 700 may require a best-fit determination within the circuit editor user interface 700. Accordingly, any of the four edges of the constraint editor user interface 700' may be similarly compared for suitable fit at the respective four orientations (above, below, left, and right of the circuit object 705) within the defined viewing area of the circuit editor user interface 700. If the violation and the circuit object 705 are proximate a middle portion of the display, suitable adaptive panning or zooming operation may be automatically performed to afford sufficient space to accommodate the constraint editor user interface 700'.

The constraint editor user interface 700' is preferably graphically rendered to be semi-transparent and displayed concurrently with the circuit editor user interface 700. The constraint editor user interface 700' may overlap with certain circuit objects such as, for example, circuit object 705. Where the constraint editor user interface 700' overlaps circuit object 701, a portion 701' of the overlapped circuit object is at least partially visible through the constraint editor 700'. An exemplary partial opacity or semi-transparency might be e.g. 50%, 60%, or any suitable value effective for a user to perceive the information within the constraint editor user interface and also perceive at least a portion of the outlines (at possibly a reduced visibility) of the underlying circuit objects of the circuit design.

In this exemplary illustration of the circuit editor user interface 700, a violation of the foundry constraint 714 has been determined inasmuch as the editing interaction 705 did not result in a polygon defining a circuit object meeting this minimum area specified in the foundry constraint of "0.06" units (please note that this example is not continuing the exemplary "40×20" unit size in the previous example). Thus, the user may modify the application of the constraints, modify the constrained value of the constraints, or modify the editing interaction to change the circuit object 705 to comply with the constraints. In this regard, the user can modify, for example, any of the foundry constrained value 714 (though generally, in practice, a user would not modify a foundry constraint), the application constraint group (CG) value, the design constraint, net constraint, or pin constraint, such as by selecting a radio button 703 corresponding with a desired hierarchical region of the circuit design and inputting or modifying a value in the value entry box 710. Additionally, a user may modify the application of the different hierarchical regions of the circuit design constraints such as by adding or removing additional layers, or inputting Boolean logic to effect selectivity or semantic order in the lookup order, such as an AND, OR, precedence, or the like. Such modifications are stored in the design database, the visual indicia are removed, the constraint editor 700' is removed, and execution of the violation detector then resumes.

Figure 8:
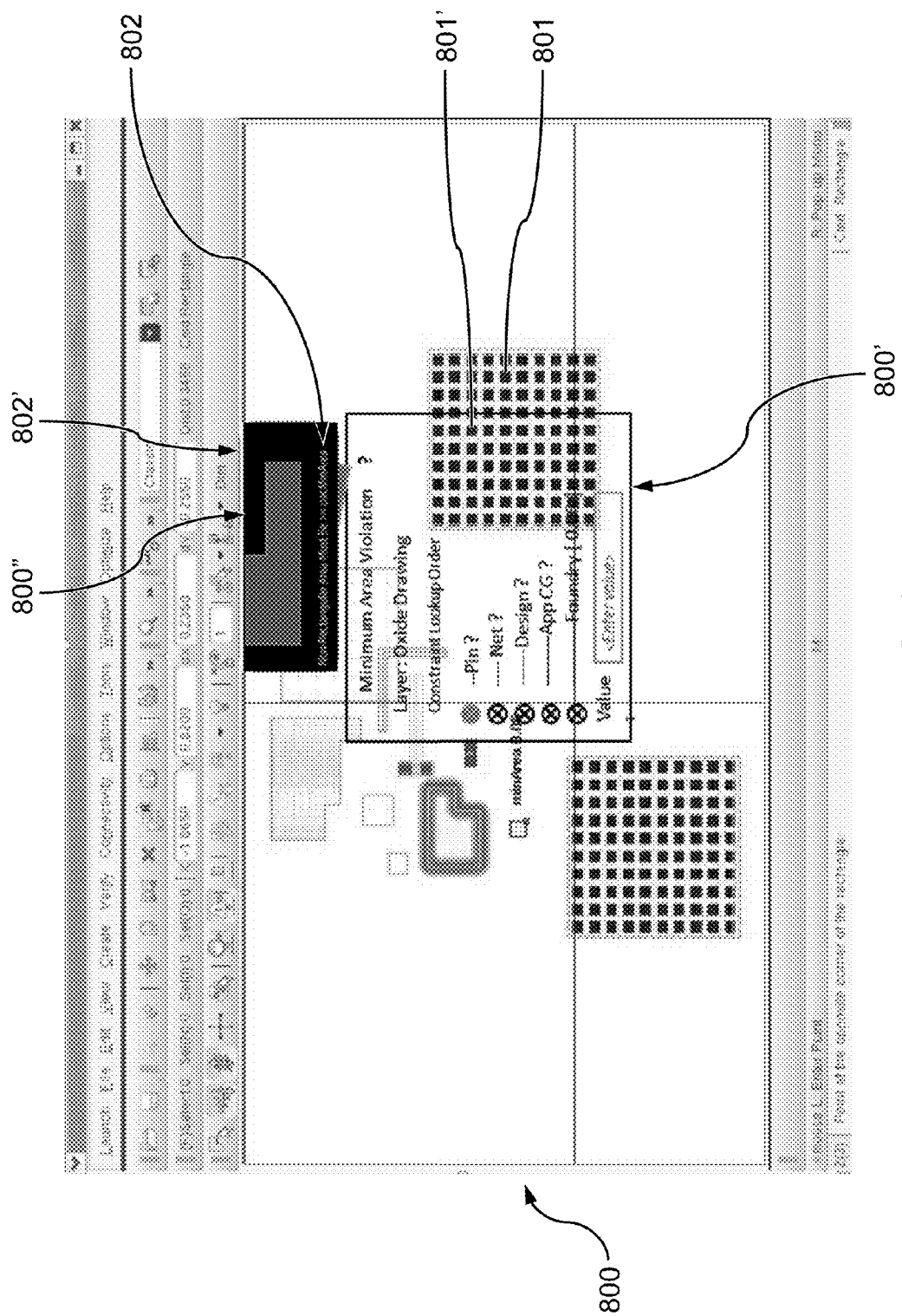
FIG. 8 shows an exemplary circuit editor user interface.

FIG. 8 shows yet another exemplary circuit editor user interface 800 including a constraint editor user interface 800' at least partially overlapping a portion of the circuit design displayed within the circuit editor user interface 800. The constraint editor user interface 800' is seen to be graphically rendered in semi-transparent or partially opaque manner and partially overlaps circuit object 801 at an overlap portion 801' of the circuit object 801. The overlap portion 801' is still at least partially visible through the constraint editor user interface 800'. Additionally, an exemplary explanation portion 800" is seen to include a textual explanation of the type of constraint 802 and a graphical illustration 802' of the type of violation (or a parameter of the circuit object deemed to be violating a circuit design constraint).

Figure 9:
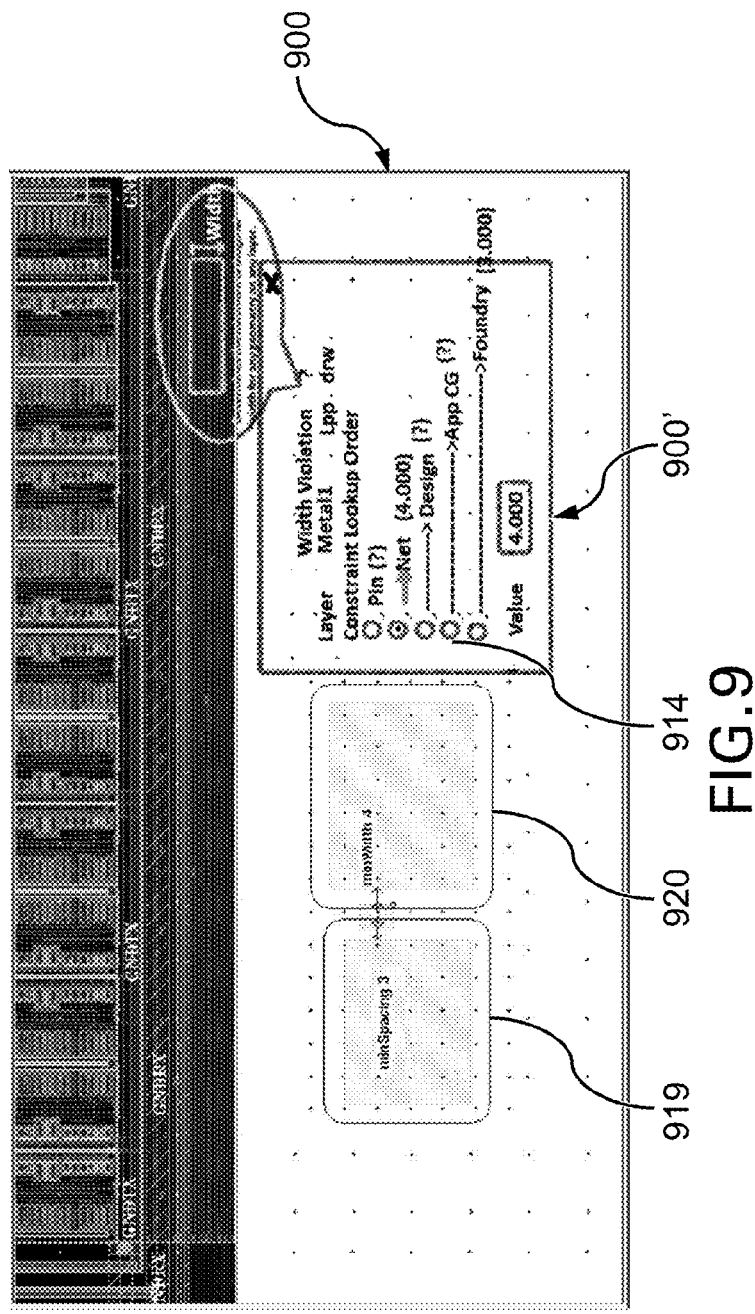
FIG. 9 illustrates an exemplary circuit editor user interface including a plurality of visual indicia for detected violations actuated by a user to trigger the constraint editor user interface.

Turning to exemplary FIG. 9, the circuit editor user interface 900 illustrates a plurality of violations 919 and 920 have been detected resulting from an editing interaction within the circuit editor user interface 900. Accordingly, execution of the circuit editor was frozen to enter a debugging mode and a corresponding plurality of visual indicia (for example, annotations, markers, or other suitable visual indicia) were graphically rendered proximate the detected violation or the circuit object being edited. When a violation is detected, the violation references the violating circuit object(s). The design database stores the violation information data object for the violation, the constraint, and the circuit object. The design database may then be queried to determine a coordinate position within the circuit editor user interface 900 to graphically render a visual indicia proximate thereto. For example, if a first editing interaction results in a new circuit object 919, the design database may be queried to determine the location on the display of the circuit object 919. Alternatively, the circuit editor user interface itself 900 or the violation detector module may be queried (or may push details of the violation) to determine where to graphically render the visual indicia. The query may be answered with a coordinate location or a set of coordinates on the display for the location such as, for example, (200, 200)-(300, 300). Knowing that the violating circuit object 919 extends from a position of e.g. (200, 200) to (300, 300) gives the dimensionality of the violating circuit object. A buffer of perhaps 20 pixels may be employed in generating a visual indicia, perhaps from the coordinates of (180, 180) to (320, 320) for an exemplary bounding box indicia encircling a perimeter of the circuit object.

This process may be repeated for each of the detected violations and the detected violating circuit objects. The execution of the circuit editor user interface 900 may be frozen, and a user selects one of the visual indicia 919, 920 for exploration and reconciliation. To effect this, a debugging mode is preferably initialized for the circuit editor user interface 900 where the user's editing interactions with the circuit design itself are inhibited and instead a user's interactions may not further modify or edit circuit objects. While the execution is frozen, user interactions are redirected to, for example, an uppermost overlay or constructive layer including merely annotations, markers, or other visual indicia. Therefore, a user actuating a user interface device to select proximate a circuit object 919 would be intercepted and redirected to select visual indicia 919 overlaying the circuit object 919. Selecting one of the visual indicia 919, 920 launches the constraint editor user interface 900' for further exploration and reconciliation of the violation.

In this illustrative snapshot of an exemplary circuit editor user interface 900, the plurality of violations 919 and 920 are seen to have two respective violating objects and two respective corresponding visual indicia (objects and indicia not individually labeled). The violation 920 has been selected by a user for additional information and reconciliation in the circuit constraint editor user interface 900'. In this instance, two constraints within the lookup order have been established and are applied to the circuit object. The net constraint has a constrained value of "4.000" units while the foundry constraint has a constrained value of "3.000" units. While the circuit object may have a width parameter dimensionality of "3", it is seen to not violate the foundry constraint, but is seen to violate the net constraint 914 minimum width established as "4.000". The user may reconcile this violation 920 by modifying the editing interaction with the object such as by increasing its width to "4", may modify the value of the net constraint "4.0" to a lower or more permissible value such as "3.0", or may modify application of the net constraint such as by setting it to "0" or NULL, by applying Boolean logic e.g. OR, applying a precedence operator, making it a soft (aspirational) constraint, or the like.

Figure 10:
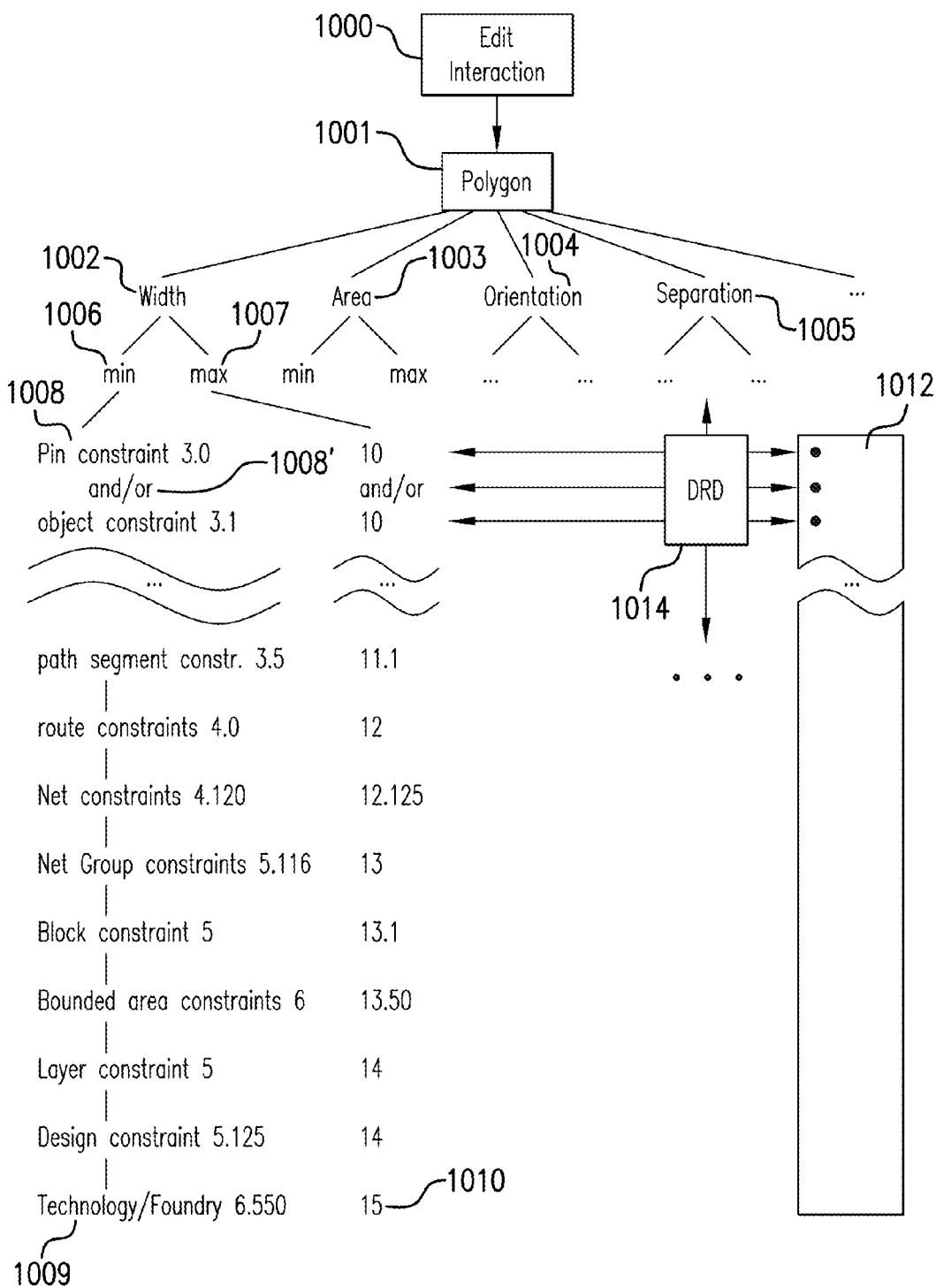
FIG. 10 is an exemplary diagram of a flow of processes in the disclosed system for generating a lookup order while evaluating a hierarchy of circuit design constraints and respective constrained values applicable to circuit objects and their plurality of parameters within the circuit design.

Turning to FIG. 10, an illustrative flow of processes for generating a constraint lookup order map 1012 is illustrated in simplified form. Responsive to an editing interaction 1000, a circuit object 1001, in this instance a polygon, is determined to result from the editing interaction 1000 or to have been modified by the editing interaction 1000. The related circuit object 1001 may be representative of but one related circuit object while there may be several or many. Indeed, with group selection tools, a user may select any number of circuit objects—for example, 200 circuit objects and effect a collective editing operation, such as a move operation.

Depending upon the editing interaction in a collective editing operation, 200 or more violations may be triggered from the editing interaction. The relevant parametric properties for the circuit object(s) e.g. circuit object 1001, for example width 1002, area 1003, orientation 1004, separation 1005, and the like, are determined for each related object. For each of the parametric properties 1002-1005, a number of constraints such as minimum 1006 and maximum 1007 may be established, amongst others. The design rule checker 1014 iterates through each of the constraints (as described above with respect to FIG. 2) at each hierarchical layer for each of the relevant parameters for each of the relevant circuit objects relating to the editing interaction 1000. Design rule checker/violation detector 1014 preferably evaluates all of the hierarchical constraints such as e.g. pin constraint 1008, any Boolean logic connecting individual constraints 1008', any precedence operators, their respective constrained values, and the like to iterate through the entirety of the hierarchical set of circuit design constraints in the illustrative, non-exhaustive, listing up and through the technology or foundry constraint 1009.

At each of the constraints, the design rule checker 1014 evaluates a constraint and preferably sets a memory pointer within a constraint lookup map 1012. As the design rule checker 1014 iterates through the entirety of the hierarchical constraint set, the constraint lookup map 1012 is incrementally generated to include a complete sequence of the applicable constraints to the related circuit object. In such manner, the lookup order (such as seen, for example, in FIG. 9) including constraint 914 may be retrieved from the lookup constraint map 1012 and graphically rendered within the constraint editor user interface 900' to provide a user with a ready understanding of the set of constraints actually applicable to a particular circuit object.

Figure 11:
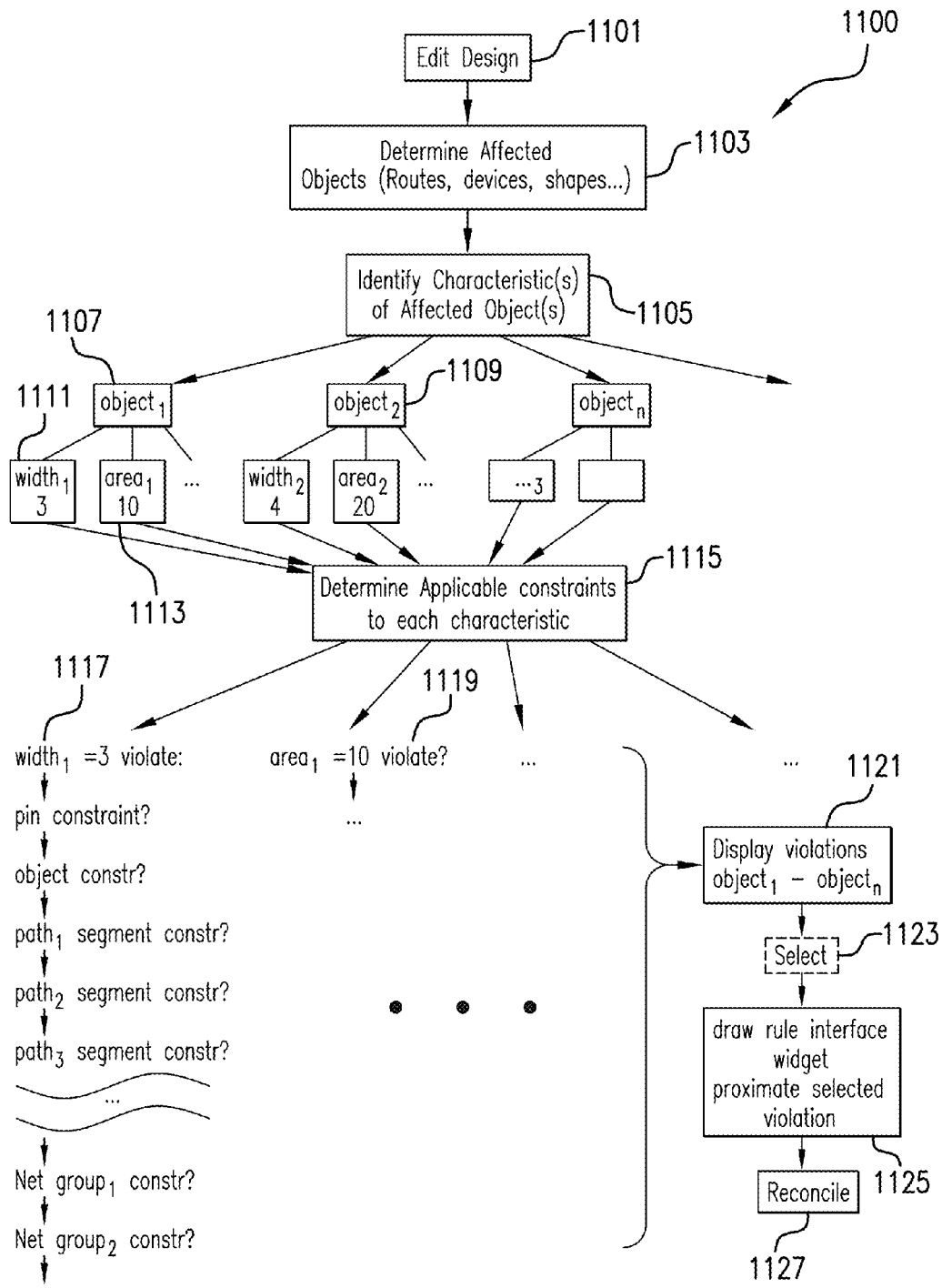
FIG. 11 shows a flow diagram illustrating an exemplary flow of processes in the disclosed system for determining affected circuit objects and parameters related to an editing interaction.

Turning to FIG. 11, an exemplary flow of processes 1100 for determining violations resulting from an editing interaction involving numerous related objects and providing for a selection of a violating circuit object to expeditiously reconcile the violation is illustratively shown. Firstly, a user makes an editing interaction at block 1101 with the circuit design within a circuit editor user interface. The affected circuit objects (e.g. 1107, 1109, . . . n) are determined at block 1103 (e.g. a created or modified polygon or neighboring preexisting circuit objects proximate the editing interaction). Such determination is preferably made through suitable queries to the design database to determine objects within a certain region of impact within the circuit design. Generally, this region of impact may be limited to be circuit objects immediately adjacent to an editing interaction. However, this region of impact may be expanded based upon available memory and processing resources for a slower calculation but more thorough evaluation. It bears noting that the always-on design rule checker need not necessarily be comprehensive and exhaustive in evaluations of violations if, upon conclusion of editing interactions, a full comprehensive and exhaustive sign-off and verification of the circuit design are to be performed.

Once the affected objects (such as e.g. routes, traces, pins, contacts, devices, polygons, and the like) are determined at block 1103, the flow proceeds to block 1105 where characteristics of the affected objects are identified. The affected objects, for example $object_1$ 1107, $object_2$ 1109, ... $object_n$ determined at block 1103 are then evaluated to determine their corresponding characteristics (such as, for example, $widthX_1$ 1111 and $areaXY_1$ 1113 are determined for $object_1$ 1107). Additionally, $widthX_2$ and $areaXY_2$ characteristics are both determined for $object_2$ 1109. This is repeated for each of the plurality of related or affected circuit objects determined at block 1103. The applicable constraints to each characteristic are determined at block 1115 (either through a pre-established lookup map as illustrated in FIG. 10 or by iterative automatic search and traversal of the hierarchy of constraints which preferably generates a lookup map), then the determined hierarchical set of constraints are each evaluated for violation by evaluating their constrained value against the corresponding characteristic value of each affected object at each flow for each of the corresponding objects characteristics. As each constraint of the hierarchical set of constraints is evaluated against each characteristic of each object, the lookup map 1012 (as seen for example in FIG. 10) is generated (if it was not earlier generated).

Flow then proceeds to block 1121 where violations are displayed with respect to each affected $object_1$-$object_n$. Such violations are preferably graphically rendered through a visual indicia proximate the affected circuit object to provide for user selection thereof at block 1123 (if there are plural). If however, only one violation and corresponding affected object were detected, then the selection of the violation and affected object at block 1123 may be performed automatically without necessarily requiring a graphical indicia or a user selection thereof. Responsive to the selection (whether automatic or manual selection by a user), the rule or constraint editor interface is graphically rendered at block 1125 to be proximate the selected violation or affected circuit object thereof. The user may then manipulate the constraint or rule interface (as discussed above) to reconcile the selected violation at block 1127.

Figure 12:
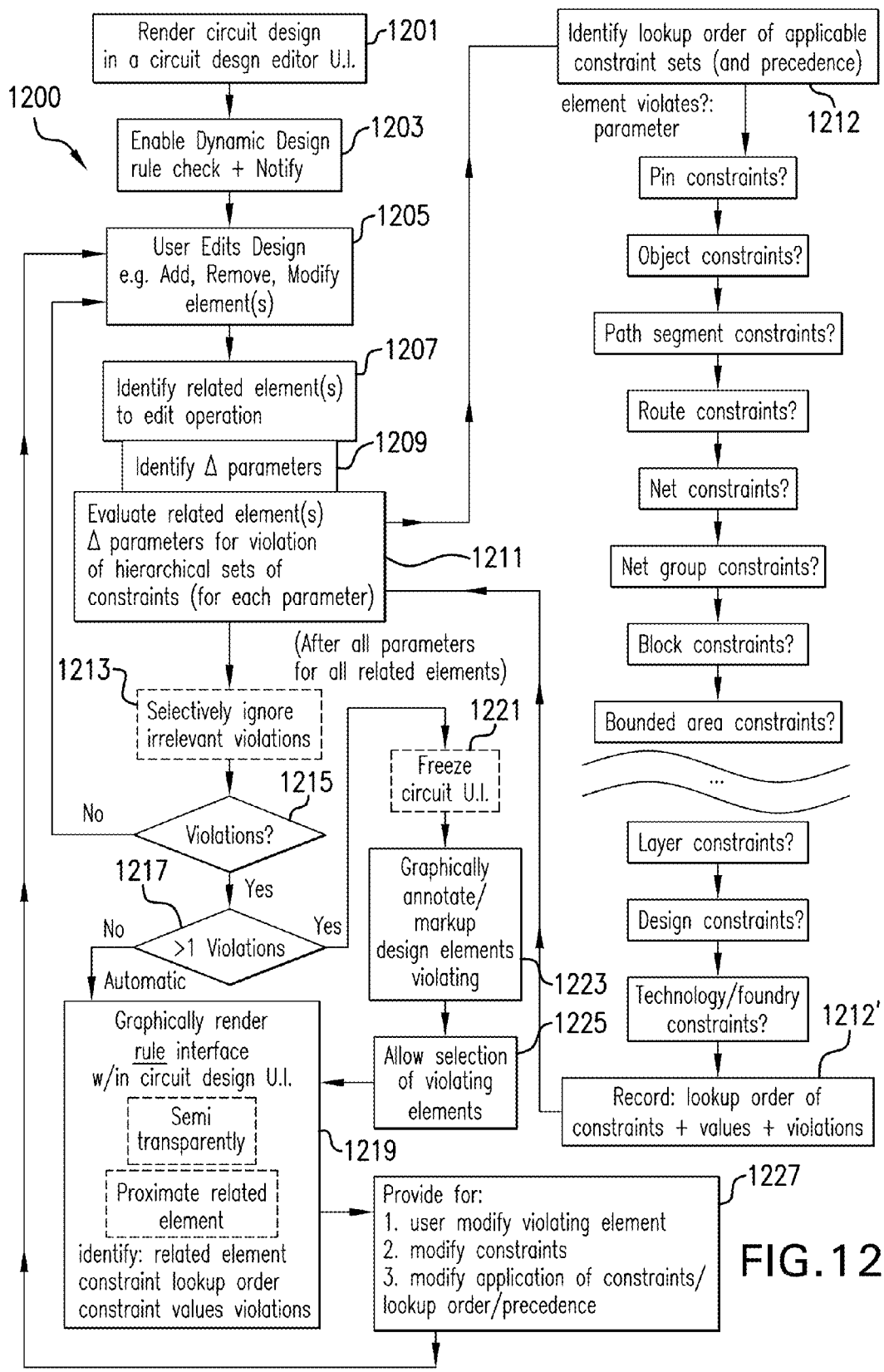
FIG. 12 shows a more detailed flow diagram illustrating a flow of processes in the disclosed system; and, FIG. 13 is a schematic block diagram of an exemplary computer system for programmatic implementation of certain aspects of the disclosed system.

Turning to FIG. 12, a more detailed flow of processes 1200 is illustrated. Firstly, at least a portion of the circuit design is retrieved from the design database. This preferably includes retrieving corresponding data structures/classes/objects representing circuit objects including circuit elements, interconnective routing, traces, constraints, netlists, and the like from the design database. Then at least a portion of the circuit design is graphically rendered in a circuit design editor user interface at block 1201. Flow then proceeds to block 1203 where a dynamic design rule check and notify-on-violation is enabled. At least one background process is continuously looping to evaluate the circuit design, changes thereto, editing interactions, and the circuit objects of the design to evaluate whether any of the hierarchical sets of circuit design constraints applicable to any of the objects or interactions are violated.

Flow then proceeds to block 1205 where a user editing interaction is received from a user interface device operably coupled to a processor(s) which is executing both the circuit design user interface and a dynamic design rule checking or rule violation detection (for simplicity and clarity, this has been described as "a" processor, however, any suitable number may be used and they may be arranged contiguously or in separate machines perhaps even separated by great distance in processing clusters or farms). The user effects an editing interaction which can include adding a circuit object, removing, or modifying circuit objects of the circuit design. Flow proceeds to block 1207 where circuit objects related to the editing interaction are identified. The identification may be based on physical, connective, or radiative proximity to an editing interaction or any other suitable measures for identifying related circuit objects.

The detected violations of any of the constraints preferably reference the affected or related circuit objects such as by a pointer to a memory location storing a circuit object data structure or class. However, any suitable data structure or class may be employed to represent, and store, the circuit objects, violations, and the like. At block 1209, parameters or characteristics of the related circuit objects are identified. If, for example, a new circuit object has been instantiated, then, the width, area, and other parameters are preferably evaluated based on the hierarchical set of design constraints applicable thereto.

At block 1211, at least a double loop is executed to evaluate each relevant parameter for each related circuit object to determine violation of any of the hierarchical sets of constraints applicable thereto. Flow proceeds from block 1211 to begin a nested loop through the illustrated non-exhaustive list of applicable hierarchical circuit design constraints at block 1212. As the nested loop executes and each relevant circuit design constraint is evaluated for each parameter of each circuit design object, the constraints are preferably recorded in a lookup order map as illustrated in FIG. 10 at block 1210. Flow proceeds to evaluate whether the circuit object characteristic violates pin constraints, object constraints, path segment constraints, route constraints, net constraints, net group constraints, block constraints, bounded area constraints, ... layer constraints, layer group constraints, design constraints, technology/boundary/app location constraints, and the like.

The more granularity in the constraint settings that are provided, the more selectively and intelligently the constraints can be focused. A large problem in the prior art is the over-promiscuous application globally of constraints to the entirety of the circuit design. By over-restricting the possible solutions to placement and routing of the circuit design, optimal solutions are foreclosed from consideration. As a result, substantially more resources and time must be expended to arrive at a workable solution for a circuit design product. Therefore, by more surgically and narrowly tailoring the selective application of constraints to more granular portions of the circuit design, a better circuit design may be arrived at and fabricated using less resources and time.

The flow then loops back from recording the lookup order at block 1212' back to the evaluation for nested loop at block 1211. Once all of the affected parameters of all of the affected objects have been evaluated, a collection or universe of violations may be determined. At block 1213, optionally, a portion of the violations are determined to be spurious, superseded, or irrelevant, merely aspirational/soft violations, preceded violations, or violations within an OR constraint group and are therefore ignored. Stated another way, a subset of the universe of detected violations are selected for further processing, whereas the remainder may be ignored (though perhaps indicated in some manner or recorded in a log file for post-mortem analysis). Flow then proceeds to decision block 1215 where it is determined whether there are still violations. Where no violations are detected, the decision block 1215 flow returns in a continuous loop to block 1205 to accept further user editing interactions and continuously evaluate for violations of the hierarchical sets of circuit design constraints. On the other hand, where violations are detected at decision block 1215, flow proceeds to decision block 1217 where it is determined if there are more than one violation or not.

If there is only one violation, then flow preferably proceeds directly to block 1219 for automatic execution and graphical rendering of a rule or constraint editor interface within the circuit design user interface. In an optional configuration, the constraint interface is graphically rendered to be semi-transparent or partially opaque to allow a contextual representation of the circuit design to the user while they also evaluate the constraints violated. Preferably, the constraint interface is rendered proximate a related element and is said to therefore be in contextual registration with the violating element resulting from the editing interaction. The constraint interface will preferably identify the related element, the constraint lookup order, constrained values, violations, and the like. If, however, at block 1217, there is greater than one violation, then flow proceeds to block 1221 where the circuit editor user interface is halted, its execution frozen, and user interface edit interactions are inhibited from applying to the circuit design and are instead adaptively intercepted and re-routed to apply selection to a plurality of visual indicia of the plural violations detected at decision block 1217.

Flow then proceeds to block 1223 where the visual indicia are graphically rendered (preferably to use annotation or markers) to indicate design elements or circuit objects violating any of the circuit design constraints. Flow then proceeds to block 1225 where a user may select any one of the violating elements for the flow to then proceed to block 1219 for the constraint interface to be graphically rendered concurrently with the circuit editor user interface on the display device. Flow then proceeds in either case to block 1227 to provide for the user to modify the detected violating element, modify constrained values of the constraints within the constraint lookup order, or modify application of constraints/modify the lookup order or precedence. Flow then repeats back to block 1205 to accept further user editing interactions with the circuit objects of the circuit design.

Herein, detected violations appear dynamically during an editing interaction. For example, moving a rectangle in a particular zone in the circuit design may cause violations of minimum spacing on both the left and right edges. The number of violations may increase if the user is moving e.g. 100 rectangles. Displaying every single violation may become needlessly duplicative and clutter the display. To alleviate this issue, a user may engage a debugging mode in the circuit editor user interface to freeze execution. The user may then select a visual indicia of a particular violation for exploration and reconciliation. A further optional step of displaying for selection only a relevant subset of the detected violations may be executed. For example, where two objects overlap, a violation may be detected for failing to maintain a certain minimum spacing and a violation may be detected for overlapping circuit objects. Displaying both violations for selection may be unnecessary as the minimum spacing may be enough to advise the user of the issue to prompt appropriate reconciliation.

Within the constraint editor user interface, a user may modify the application of the constraints to a particular object. Constraints may be applied at any hierarchical level in constraint groups. Constraint groups may employ operators to signify their semantic ordering to determine how the constraints in the group are to be applied. Within the constraint editor window, a user may suitably specify precedence and combinational Boolean logic such as AND, OR, NOR, and the like. Use of the AND operator will require that ALL of the constraints within a constraint group must be met for the particular circuit object, whereas the OR operator requires only one of the constraints within the group to be satisfied for the group to be satisfied. Precedence may specify that once a first constraint is determined to be satisfied, all others in the group may be ignored, amongst other functional uses. Additionally a user may modify whether a constraint is a hard/definite constraint or a soft/flexible/aspirational constraint which is preferable but may be ignored. Such a soft constraint is enforced if possible—but if other overriding concerns of the design require, the soft constraint may be ignored or selectively removed from application to a particular hierarchal layer of the design.

An exemplary flow for a user modifying constraints to override a global technology/foundry constraint within a simplified lookup order of the hierarchy of circuit design constraints within the constraint editor is illustratively shown below for a minimum width constraint.

| Rule := minWidth for Layer1 |
| --- |
| 1\| Pathseg ? |
| 2\|    Route ? |
| 3\|       Net ? |
| 4\|          Design ? |
| 5\|            Tech (Foundry) 0.5microns |

*No override at this level yet.

The user wants to change this value for all path segments of a particular design which are on Layer 1. To accomplish this within the constraint editor user interface, the user selects the Design layer of the lookup order and enters a value of "4.0" microns:

| 1\| Pathseg ? |
| --- |
| 2\|    Route ? |
| 3\|       Net ? |
| 4\|          Design 4microns |
| 5\|            Tech (Foundry) 0.5microns |

Responsively, the constraint editor module interacts with the design database to create a new constraint in the design's constraint group for Layer 1's minWidth constraint applied to width parameters and set its constrained value to "4".

Ordinarily, we cannot establish a value less than foundry. If the foundry establishes that the minimum width it expects is X units then the user can only put a tighter constraint in the other hierarchical layers and say that for certain designs that shapes less than Y (where Y is necessarily >X) is not allowed. Foundry rules are generally the physical limits set by the foundry vendor's manufacturing technology.

Next the user wants to override the Design constraint for all path segments which are on the same route as the path segment that he is currently inspecting. He effects this override by establishing a constrained value of "3" microns for the Route constraint.

```
1|  Pathseg ?
2|    Route 3 microns
3|      Net ?
4|        Design 4microns
5|          Tech (Foundry) 0.5microns
```

The user then decides that the path segment whose constraint violation he is currently debugging needs a specific override. To effect this more granular override, the user established a constrained value of "1" micron for the Path segment hierarchical layer within the lookup order.

```
1|  Pathseg 1micron
2|    Route 3 microns
3|      Net ?
4|        Design 4microns
5|          Tech (Foundry) 0.5microns
```

In various configurations of the invention, the system may be implemented in the form of software modules or hardware modules. In an exemplary configuration of the invention, the system is implemented as part of an Electronic Design Automation (EDA) software suite or may be implemented in any suitable circuit design tool.

Figure 13:
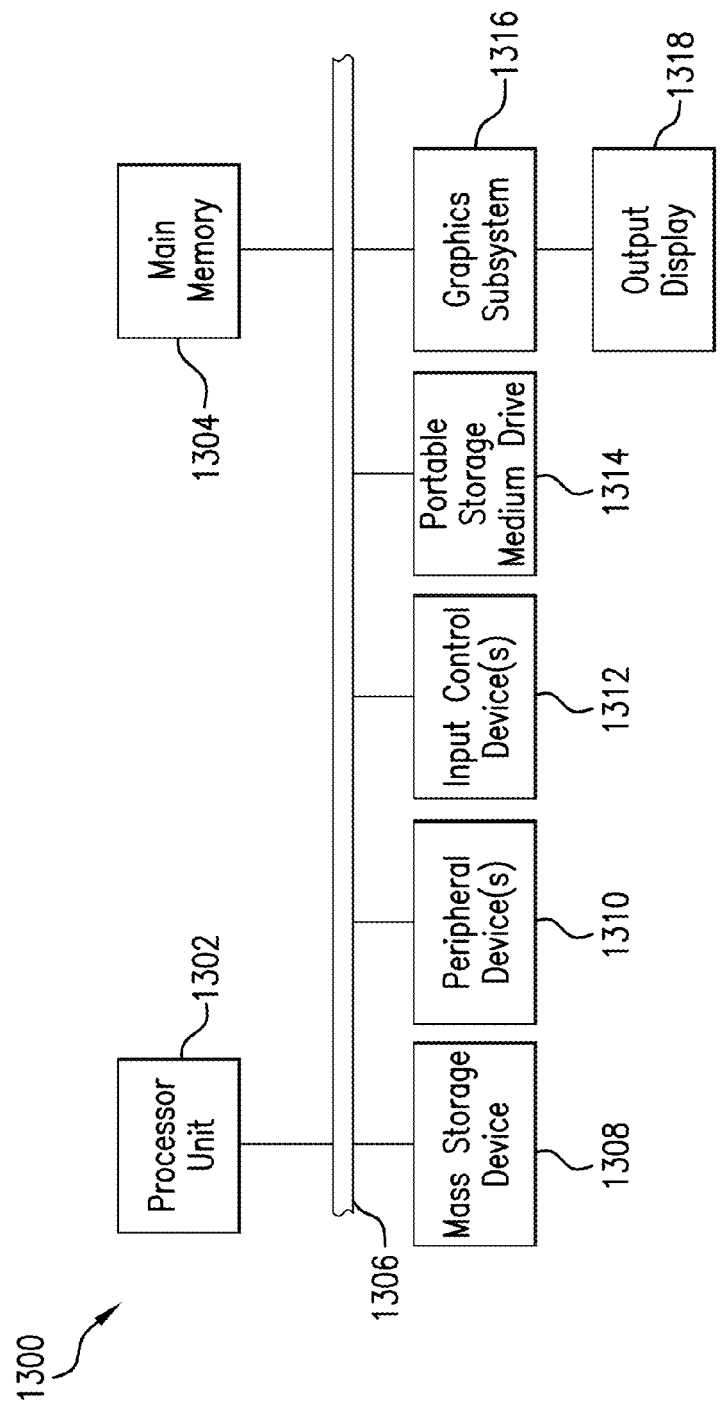

FIG. 13 illustrates a block diagram of a computer system for executing such EDA in accordance with various configurations of the present invention. A computer system 1300 contains a processor unit 1302, a main memory 1304, an interconnect bus 1306, a mass storage device 1308, peripheral device(s) 1310, input control device(s) 1312, portable storage medium drive(s) 1314, a graphics subsystem 1316, and an output display 1318. Processor unit 1302 may include a single microprocessor or a plurality of microprocessors for configuring computer system 1300 as a multi-processor system. Main memory 1304 stores, in part, instructions and data to be executed by processor unit 1302. Main memory 1304 preferably includes banks of dynamic random access memory (DRAM) as well as high-speed cache memory.

For the purpose of simplicity, all the components of computer system 1300 are connected via interconnect bus 1306. However, computer system 1300 may be connected through one or more data transport means. For example, processor unit 1302 and main memory 1304 may be connected via a local microprocessor bus; and mass storage device 1308, peripheral device(s) 1310, portable storage medium drive(s) 1314, and graphics subsystem 1316 may be connected via one or more input/output (I/O) buses. Mass storage device 1308, which may be implemented with a magnetic disk drive, an optical disk drive, a solid state device, or an attachment to network storage, is a non-volatile storage device for storing data and instructions, to be used by processor unit 1302. In a software configuration, mass storage device 1308 may store the software to load it to the main memory 1304.

Portable storage medium drive 1314 operates in conjunction with a portable non-volatile storage medium, such as a floppy disk, a compact disc read only memory (CD-ROM), or a digital versatile disc read only memory (DVD-ROM), to input and output data and code to and from the computer system 1300. In one configuration, the software is stored on such a portable medium, and is input to computer system 1300 via portable storage medium drive 1314. Peripheral device(s) 1310 may include any type of computer support device such as an input/output (I/O) interface, to add additional functionality to computer system 1300. For example, peripheral device(s) 1310 may include a network interface card, to interface computer system 1300 to a network.

Input control device(s) 1312 provide a portion of the user interface for a computer system 1300 user. Input control device(s) 1312 may include an alphanumeric keypad for inputting alphanumeric and other key information; and a cursor control device such as a mouse, a trackpad or stylus; or cursor direction keys.

In order to display textual and graphical information, computer system 1300 contains graphics subsystem 1314 and output display(s) 1318. Output display 1318 may include a cathode ray tube (CRT) display, liquid crystal display (LCD), plasma, or active matrix organic light emitting diode (AMOLED) display. Graphics subsystem 1316 receives textual and graphical information, and processes the information for output to display 1318.

In a software implementation, the EDA software includes a plurality of computer executable instructions, to be implemented on a computer system. Prior to loading in a computer system, the EDA software may reside as encoded information on a computer-readable tangible medium such as a magnetic floppy disk, a magnetic tape, CD-ROM, DVD-ROM, flash memory, or any other suitable computer readable medium.

In a hardware implementation, the invention may comprise a dedicated processor or processing portions of a system on chip (SOC), portions of a field programmable gate array (FPGA), or other such suitable measures, executing processor instructions for performing the functions described herein. Suitable circuits may also be developed to perform these functions.

Thereby, a user with minimal interactions with the user interface of an EDA tool such as a circuit layout editor, schematic editor, mask editor, or the like may expeditiously and selectively apply and reconcile constraints of a hierarchical set of constraints to a circuit design.

The descriptions above are intended to illustrate possible implementations of the present invention and are not restrictive. While this disclosure has been made in connection with specific forms and embodiments thereof, it will be appreciated that various modifications other than those discussed above may be resorted to without departing from the spirit or scope of the claimed invention. Such variations, modifications, and alternatives will become apparent to the skilled artisan upon review of the disclosure. For example, functionally equivalent elements or method steps may be substituted for those specifically shown and described, and certain features may be used independently of other features, and in certain cases, particular locations of elements or sequence of method steps may be reversed or interposed, all without departing from the spirit or scope of the invention as defined in the appended Claims. The scope of the claimed invention should therefore be determined with reference to the description above and the appended claims, along with their full range of equivalents.

What is claimed is:

1. A method for selective application and reconciliation of hierarchical ordered sets of circuit design constraints within a circuit design editor, the sets respectively relating to different hierarchical portions of the circuit design, the method comprising:
   (A) executing a computer processor-based circuit design editor to graphically render on a display device at least a portion of a circuit design within a circuit editor user-interface, the circuit design including a plurality of interconnected circuit objects maintained in a computer memory operably coupled to the computer processor;
   (B) detecting any violation of at least one circuit design constraint of the hierarchical sets of constraints responsive to an editing interaction executed on the circuit design editor with a circuit object of the displayed portion of the circuit design within the circuit editor user-interface;

(C) graphically indicating a violating object relating to a detected violation of at least one circuit design constraint;

(D) temporarily arresting execution of circuit editing operations by the circuit design editor and graphically rendering on the display device a constraint interface concurrently with the graphic rendering of the circuit design portion in the circuit editor user-interface, the constraint interface defining a graphic window adaptively superimposed in contextually registered and variably positioned manner proximate the violating object in the circuit design portion as graphically rendered, the constraint interface identifying to a user: a type of the detected violation and a hierarchical source of the circuit design constraint violated; and, (E) responsive to a user input within the circuit editor user-interface, selectively: (1) modifying the editing interaction, (2) modifying the application of at least one circuit design constraint of the hierarchical set of constraints, or (3) modifying at least one circuit design constraint of the hierarchical set of constraints, to reconcile the detected violation.

2. The method as recited in claim 1, wherein graphically rendering the constraint interface includes rendering the constraint interface in semi-transparent manner superimposed over the displayed portion of the circuit design within the circuit editor user-interface to thereby generate a composite display including the constraint interface and the displayed portion of the circuit design at least partially visible through the constraint interface.

3. The method as recited in claim 2, wherein the detecting any violation of at least one circuit design constraint of the hierarchical sets of constraints includes identifying all constraints and respectively constrained values relating to the violating object to establish a constraint lookup-order.

4. The method as recited in claim 3, wherein the graphically rendering the constraint interface includes graphically rendering the constraint lookup-order of the hierarchical sets of circuit design constraints respectively relating to identified hierarchical portions of the circuit design including at least a portion of: an object, a device, a net portion, a grouping of devices, a circuit design layer, the circuit design, and a fabrication technology for the circuit design.

5. The method as recited in claim 4, wherein the graphically rendering the constraint interface includes establishing an interactive constrained-value-setting portion for entry of a value by a user to modify a value of at least one selected constraint values of at least one circuit design constraint in the constraint lookup order.

6. The method as recited in claim 5, wherein the graphically rendering the constraint interface includes graphically rendering a textual explanation and graphical illustration of the type of circuit design constraint relating to the detected violation.

7. The method as recited in claim 6, wherein the identifying to a user a hierarchical source of the circuit design constraint violated includes: graphically indicating a circuit design constraint violated in the constraint lookup order according to a parameter of the violating object relative to a constrained value of the violated circuit design constraint.

8. The method as recited in claim 7, wherein the identifying the violating object relating to a detected violation includes:
detecting a plurality of violations;
detecting a relationship between each of the detected violations and a respective violating object; and,
graphically rendering a visual indicia proximate the violating object within the displayed portion of the circuit design, the visual indicia being user selectable to identify a violating object.

9. The method as recited in claim 8, wherein the graphically rendering the constraint interface in contextual registration proximate the violating object is performed according to a user selection of the user-selectable visual indicia.

10. The method as recited in claim 9, wherein the user-selectable visual indicia is graphically rendered to overlay the displayed portion of the circuit design within the circuit editor user interface and is selected from one of an annotation and a marker.

11. The method as recited in claim 10, wherein a debugging mode is established within the circuit editor user interface responsive to a user interaction, the debugging mode inhibiting user interactions with circuit objects and remapping user interactions to the user-selectable visual indicia.

12. The method as recited in claim 1, wherein the detecting any violation includes:
detecting all violations; and,
selecting a subset of the plurality of violations according to a predetermined set of relevance factors.

13. The method as recited in claim 12, wherein the identifying a violating object relating to a detected violation includes:
graphically identifying by annotating with a visual indicia at least one violating object in the displayed portion of the circuit design responsive to the selected subset of detected violations; and,
accepting a user selection of one of the visual indicia to identify the violating object.

14. A circuit editor system having selective application and reconciliation of hierarchical ordered sets of circuit design constraints, the sets respectively relating to different hierarchical portions of a circuit design, the system comprising:
a design database stored in a memory maintaining the circuit design including a plurality of interconnected circuit objects and the hierarchical ordered sets of circuit design constraints;
a computer processor-based circuit editor module operably coupled to the design database, the circuit editor module retrieving at least a portion of the plurality of interconnected circuit objects and graphically rendering circuit objects of at least a corresponding portion of the circuit design within a circuit editor user-interface on a display and receiving user editing interactions with at least one circuit object of the circuit design;
a computer processor-based violation detection module operably coupled to the circuit editor module and the design database, the violation detection module executing to detect any violation of at least one circuit design constraint of the hierarchical sets of constraints responsive to an editing interaction with a circuit object of the displayed portion of the circuit design within the circuit editor user-interface by a user and graphically indicate a violating circuit object relating to a detected violation of at least one circuit design constraint; and,
a computer processor-based constraint module operably coupled to the violation detection module and the design database executing to:
retrieve circuit design constraints and circuit object data relating to the violating circuit object from the design database, temporarily arresting execution of circuit editing operations by the circuit editor module and graphically render on the display a constraint interface concurrently with the graphic rendering of the circuit design portion in the circuit editor user-interface, the constraint interface defining a graphic window adaptively superimposed in contextually registered and variably positioned manner proximate the violating object in the circuit design portion as graphically rendered, the constraint interface identifying to a user: a type of the detected violation and an hierarchical source of the circuit design constraint violated, and responsive to a user input within the circuit editor user-interface, selectively: (1) modify the editing interaction, (2) modify the application of at least one circuit design constraint of the hierarchical set of constraints, or (3) modify at least one circuit design constraint of the hierarchical set of constraints, to reconcile the detected violation.

15. The system as recited in claim 14, wherein the constraint module selectively modifies circuit object data or circuit design constraints of the hierarchical set of constraints responsive to user input within the circuit editor user-interface.

16. The system as recited in claim 15, wherein the constraint module graphically renders the constraint interface in semi-transparent manner with partial-opacity superimposed over the displayed portion of the circuit design within the circuit editor user-interface to thereby generate a composite display including the constraint interface and the displayed portion of the circuit design at least partially visible through the constraint interface.

17. A computer processor-based circuit editor system having selective application and reconciliation of hierarchical ordered sets of circuit design constraints, the sets respectively relating to different hierarchical portions of a circuit design, the system comprising:

a design database stored in a computer memory maintaining a data representation of the circuit design including a plurality of interconnected circuit objects and the hierarchical ordered sets of circuit design constraints relating to the plurality of interconnected circuit objects;

a circuit editor executing in the computer processor, the circuit editor retrieving at least a portion of the plurality of interconnected circuit objects from the design database in the computer memory and graphically rendering corresponding circuit objects of at least a portion of the circuit design within a circuit editor user-interface on the display device and receiving user editing interactions with the portion of the circuit design from the user interface device;

a violation detector executing in the computer processor to detect any violation of at least one circuit design constraint of the hierarchical sets of constraints responsive to a user editing interaction with a circuit object of the displayed portion of the circuit design within the circuit editor user-interface by a user manipulating the user interface device, and graphically indicating a violating circuit object relating to a detected violation; and, a constraint editor executing in the computer processor to temporarily arrest execution of circuit editing operations by the circuit editor and graphically render on the display device a constraint interface concurrently with the graphic rendering of the circuit design portion in the circuit editor user-interface, the constraint interface defining a graphic window adaptively superimposed in contextually registered and variably positioned manner proximate violating object in the circuit design portion as graphically rendered, the constraint interface identifying to a user: a type of the detected violation and an hierarchical source of the circuit design constraint violated, and responsive to a user input within the circuit editor user-interface, selectively: (1) modifying the violating object in the design database, (2) modifying the application of at least one circuit design constraint of the hierarchical set of constraints, or (3) modifying at least one circuit design constraint of the hierarchical set of constraints, to reconcile the detected violation.

18. The system as recited in claim 17, wherein the constraint editor graphically rendering the constraint interface includes rendering the constraint interface in semi-transparent manner with partial-opacity superimposed over the displayed portion of the circuit design within the circuit editor user-interface to thereby generate a composite display including the constraint interface and the displayed portion of the circuit design at least partially visible through the constraint interface.

19. The system as recited in claim 18, wherein the violation detector executes to detect any violation of at least one circuit design constraint of the hierarchical sets of constraints includes identifying all constraints and respectively constrained values relating to the violating object to establish a constraint lookup-order.

20. The system as recited in claim 19, wherein the constraint editor executing to graphically render the constraint interface graphically renders the constraint lookup-order of the hierarchical sets of circuit design constraints respectively relating to identified hierarchical portions of the circuit design including a plurality of: an object, a device, a net portion, a grouping of devices, a circuit design layer, the circuit design, and a fabrication technology for the circuit design.

* * * * *